United States Patent
Weiss et al.

(10) Patent No.: US 6,232,365 B1
(45) Date of Patent: May 15, 2001

(54) LOW TEMPERATURE ELECTRON BEAM POLYMERIZATION

(75) Inventors: Douglas E. Weiss, Golden Valley; Thu-Van T. Tran, Maplewood; Bruce A. Sventek, Saint Paul, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/118,392

(22) Filed: Jul. 17, 1998

(51) Int. Cl.$^7$ ............... C08F 2/46; C08G 63/02
(52) U.S. Cl. ............... 522/178; 528/176
(58) Field of Search ............... 528/176; 427/50; 522/178

(56) References Cited

U.S. PATENT DOCUMENTS

| | | | |
|---|---|---|---|
| 2,956,904 | 10/1960 | Hendricks | 117/93 |
| 3,265,604 | 8/1966 | Harlan, Jr. et al. | 204/159.24 |
| 3,424,638 | 1/1969 | Marans | 156/272 |
| 3,661,618 | 5/1972 | Brookman et al. | 172/62 |
| 3,772,063 | 11/1973 | Fukukawa et al. | 117/93.31 |
| 3,897,295 | 7/1975 | Dowbenko et al. | 156/272 |
| 4,181,752 | 1/1980 | Martens et al. | 427/54.1 |
| 4,438,177 | 3/1984 | Potter et al. | 428/355 |
| 4,521,445 | 6/1985 | Nablo et al. | 427/44 |
| 4,810,523 | 3/1989 | Williams et al. | 427/36 |
| 4,842,893 | 6/1989 | Yializis et al. | 427/44 |
| 5,032,461 | 7/1991 | Shaw et al. | 428/461 |
| 5,440,446 | 8/1995 | Shaw et al. | 361/301.5 |

FOREIGN PATENT DOCUMENTS 0 542 201 B1    8/1996   (EP) .

OTHER PUBLICATIONS

Meskan, D. A., "Developments in Electron Beam Processing: Higher Capacity, Better Performance", pp. 375–378.

Postma, N. B., Weiss, D. E., Kalweit, H. W., Janus, L. R., "Low Voltage Dosimetry", Rad Tech 90–North America Radiation Curing Conference and Exposition Proceedings, vol. 2, Mar. 25–29, 1990, pp. 329–340.

Hayashi et al, Journal of Applied Polymer Science, vol. 36, 295–308 (1998) "Radiation–Induced Polymerization of Methyl Methacrylates at High Dose Rate".

Dowbenko et al, ChemTech, 539–543 (Sep. 1974), "Radiation Polymerization for PSAs".

Primary Examiner—Terressa M. Boykin
(74) Attorney, Agent, or Firm—Melanie G. Gover

(57) ABSTRACT

A method for polymerizing a free-radical initiated adhesive syrup of an $C_{8-13}$ alkyl acrylate monomer, optionally including one or more comonomers, by irradiating the adhesive syrup with about 20 to 100 kGy of accelerated electrons over a residence time of greater than 1 second at a temperature below 20° C. The method produces a pressure-sensitive adhesive with balanced peel adhesion, shear strength and conversion.

23 Claims, No Drawings

LOW TEMPERATURE ELECTRON BEAM POLYMERIZATION

FIELD OF THE INVENTION

This invention relates to methods of polymerizing monomers and/or oligomers using accelerated electrons and articles made thereby. The invention particularly relates to the electron beam polymerization of acrylate pressure-sensitive adhesives.

BACKGROUND OF THE INVENTION

Electron beam (e-beam) irradiation is widely used to crosslink a variety of different polymers for purposes of improving various properties such as hardness, tensile strength and shear strength. E-beam irradiation is also used to polymerize multifunctional oligomers and/or multifunctional monomers to make hard, scratch resistant coatings. However, due to the tendency of e-beam irradiation to effect substantial crosslinking, chain scission and grafting within treated polymers, e-beam irradiation is not generally considered an effective option for forming polymers having a high molecular weight distribution between crosslinks. Hence, other forms of irradiation, such as gamma ray and ultraviolet light, are commonly used to make polymers requiring a high molecular weight distribution between crosslinks, such as polymers having a low Tg and pressure-sensitive adhesives requiring high shear strength and high peel adhesion.

Polymers in general, and pressure-sensitive adhesives in particular, are increasingly being asked to meet demanding application requirements within ever tighter performance limitations and manufacturing specifications (e.g., polymerization with minimal use of environmentally damaging solvents).

For certain applications, such as pressure-sensitive adhesive applications, polymers need to exhibit the high tensile strength and elongation properties attainable only with high molecular weight lengths between crosslinks. Polymers having high molecular weight lengths between crosslinks also provide the necessary balancing of viscous and elastic properties required for a pressure-sensitive adhesive. In general, the adhesion, cohesion, stretchiness, and elasticity of a pressure-sensitive adhesive is dictated by the attributes of the polymer used in the composition.

Gamma irradiation is useful for sterilizing products as well as polymerizing polymers in bulk and batch processes, but is generally too slow for use in making adhesive tape in a continuous, on-web process.

Ultraviolet light is useful for polymerizing various polymers, including pressure-sensitive adhesives, without the use of a solvent. However, ultraviolet polymerization has several significant limitations. First, ultraviolet light polymerization occurs only in connection with monomeric species that absorb ultraviolet light. Since most monomers do not absorb sufficient ultraviolet light to initiate polymerization, photoinitiators are usually added to the monomers. Photoinitiators are materials that decompose into free-radicals or cations upon exposure to ultraviolet radiation. These free-radicals and/or charged molecules then initiate polymerization of the monomers. Unfortunately, photoinitiators can contribute various undesirable attributes to the resultant polymer, including yellowing of the polymer, contamination of the polymeric material with unreacted initiator and initiator fragments added to the polymer, and higher overall material costs. These contaminants can be undesirable because they can form color centers, tend to migrate to the adhesive bond surface where they inhibit performance, and are capable of initiating subsequent reactions upon exposure to ultraviolet light. The presence of such contaminants are particularly troublesome in the food and medical areas where the presence of photoinitiators is simply unacceptable due to the potential for skin irritation and toxicity.

Second, only monomeric compositions which are transparent to ultraviolet light can be effectively polymerized with ultraviolet light. Compositions that are translucent or opaque to ultraviolet light will only polymerize on the surface, since ultraviolet light cannot penetrate into the bulk of the composition. Thus, the use of many desired modifiers that absorb ultraviolet light (such as carbon black, glass beads, ultraviolet light stabilizers and colorants) and various physical structures (such as foamed adhesives and suspended particles) is limited when the monomeric composition is to be polymerized by ultraviolet light.

E-beam polymerization overcomes a number of the limitations inherent with gamma ray and ultraviolet light polymerization. However, the use of e-beam polymerization has been limited due to the inherent tendency of e-beam radiation to produce short-chain, branched, highly crosslinked polymeric structures. This phenomenon is exhibited by the tendency for e-beam polymerized pressure-sensitive adhesives to exhibit pop-off failures, frequently accompanied by low peel strength. A second limitation observed with typical e-beam polymerization techniques is a substantial concentration of residuals (e.g., unreacted monomers) remaining in the resultant polymerized product (i.e., low conversion).

SUMMARY OF THE INVENTION

A continuing need exists for a solventless and chemical initiator-free method of effecting the high-conversion radiation polymerization of polymers, particularly those intended for use as pressure-sensitive adhesives, which is effective for producing long-chain polymers with limited crosslinking over a broad range of coated thicknesses and with high conversion, regardless of whether the composition is transparent, translucent or opaque.

The present invention provides a method for polymerizing a free-radical initiated adhesive syrup of a $C_{8-13}$ alkyl acrylate monomer, optionally including one or more copolymerizable monomers, after coating of the syrup onto a surface, by irradiating the adhesive syrup with accelerated electrons at a temperature below 20° C. Preferred $C_{8-13}$ alkyl acrylate monomers include isooctyl acrylate and 2-ethylhexyl acrylate. The optional copolymerizable monomers are preferably polar monomers selected so as to form a pressure-sensitive adhesive when polymerized with the $C_{8-13}$ alkyl acrylate monomer. The invention also encompasses adhesive compositions produced by this process.

A preferred embodiment of the invention involves irradiation of the adhesive syrup at a temperature below 20° C. with about 20 to 100 kilogray (kGy) of accelerated electrons over a residence time of greater than about 1 second, preferably greater than about 5 seconds, to form a pressure-sensitive adhesive. The preferred embodiment is generally effective for making an acrylate pressure-sensitive adhesive having a peel adhesion to glass of greater than about 25 Newton/decimeter (N/dm) and a shear strength of greater than about 300 minutes, with a conversion of greater than about 90 wt %.

A further preferred embodiment of the invention involves irradiation of the adhesive copolymerizable syrup at a temperature below 20° C. with about 20 to 100 kGy of accelerated electrons over a residence time of greater than about 1 second, preferably greater than about 5 seconds, to form a pressure-sensitive adhesive. The further preferred embodiment is generally effective for making an acrylate pressure-sensitive adhesive having a peel adhesion to glass of greater than about 55 N/dm and a shear strength of at least 10,000 minutes, with a conversion of greater than about 97 wt %.

The invention is effective for quickly and efficiently producing polymers having a crosslink density suitable for use in a pressure-sensitive adhesive composition requiring superior peel adhesion and superior shear strength, without the use of solvents or chemical initiators and with high conversion.

DETAILED DESCRIPTION OF THE INVENTION

Definitions

As utilized herein, including the claims, the phrase "syrup" is utilized in accordance with its conventional definition to reference compositions of one or more polymerizable monomers, oligomers and/or polymers that have coatable viscosities and do not exhibit any appreciable pressure-sensitive adhesive characteristics until cured. Such syrups typically achieve a coatable viscosity through partial polymerization or through the addition of organic or inorganic thickening agents.

As utilized herein, including the claims, the term "conversion" is utilized in accordance with its conventional industry meaning to reference the non-volatile, reacted portion of the polymerized adhesive mass that is incorporated into the polymer chain and does not remain as a monomeric or oligomeric residue, moisture or decomposition fragments, and/or unreactive contaminant.

As utilized herein, including the claims, the term "wt %" is utilized in accordance with its conventional industry meaning and is based upon the total weight of solids in the referenced composition.

Process

Pressure-sensitive adhesives must generally balance several competing properties (e.g., tackiness, peel strength, creep resistance, cohesiveness, etc.) in order to meet the requirements of the particular end use to which the adhesive is to be employed. The properties of a pressure-sensitive adhesive are primarily affected by monomer composition, molecular weight and crosslink density. For example, monomer composition generally determines the glass transition temperature ($T_g$), bulk properties and surface chemistry of the adhesive, all of which affect adhesion. With respect to polymers having a sufficient crosslink density, higher molecular weights normally result in better cohesion. Cohesion can also be increased by increasing the degree of covalent crosslinking between ionically bonded polymers and secondary intermolecular bonding.

Acrylate pressure-sensitive adhesives having superior peel adhesion and shear strength with high conversion can be obtained without the use of solvents by e-beam copolymerization of the acrylate pressure-sensitive adhesive syrup within defined dose and residence time ranges when irradiated at lower than ambient temperatures (i.e., less than about 20° C.).

Pressure-sensitive adhesives with high conversion are particularly important for adhesives intended for medical, optical and electronic applications, where even small amounts of residual monomer may irritate the skin, inhibit the transmission of light and/or damage or corrode metal parts.

Polymerizable Pressure-Sensitive Adhesive Monomers Constituents

Monomers

Acrylate Monomers

Alkyl acrylate monomers useful in this invention are those that free-radically polymerize quickly such that temperatures lower than ambient permit propagation reactions to occur preferentially over termination or crosslinking reactions. If the relative reaction rates do not sufficiently favor propagation or if additional reaction stops occur such as chain-transfer reactions or slow copolymerization reactions, lower temperatures will not permit the formation of polymers having sufficiently long segments between crosslinks to make satisfactory higher shear pressure-sensitive adhesives.

Free-radically polymerizable acrylate monomers useful in the adhesive syrup of the invention are those that have a homopolymer glass transition temperature less than about 0° C., and preferably less than about -20° C. Useful alkyl acrylate monomers are monofunctional acrylic acid esters of non-tertiary alkyl alcohols having from 8 to 13 carbon atoms in the alkyl moiety. Examples of useful alkyl acrylate monomers include, but are not limited to, n-octyl acrylate, isooctyl acrylate, 2-ethylhexyl acrylate, isononyl acrylate, n-decyl acrylate, n-dodecyl acrylate, tridecyl acrylate and mixtures thereof.

Comonomers

The $C_{8-13}$ alkyl acrylate monomer can be copolymerized with a copolymerizable monomer capable of producing a polymer effective as a pressure-sensitive adhesive without adversely impacting the ability to polymerize the $C_{8-13}$ alkyl acrylate monomer by e-beam radiation at the temperature, residence times, and total dose parameters of the invention. Suitable comonomers include functional polar and nonpolar monomers, including both acidic and basic polar monomers.

A class of suitable comonomers include monoethylenically unsaturated comonomers having homopolymer glass transition temperatures (Tg) greater than about 0C., preferably greater than 15° C.

Examples of useful polar copolymerizable monomers include, but are not limited to, acrylic acid, methacrylic acid, itaconic acid, N-vinyl pyrrolidone, N-vinyl caprolactam, substituted acrylamides, such as N,N,-dimethyl acrylamide and N-octylacrylamide, dimethylaminoethyl methacrylate, acrylonitrile, 2-carboxyethyl acrylate, maleic anhydride, and mixtures thereof.

Other suitable copolymerizable monomers include acrylate esters or vinyl esters of non-tertiary alkyl alcohols having from 1 to 3 carbon atoms in the alkyl moiety. Examples of such monomers are methyl acrylate, ethyl acrylate, methyl methacrylate, ethyl methacrylate, vinyl acetate, vinyl propionate, and the like. A specific example of a suitable nonpolar monomer is isobornyl acrylate.

When a comonomer is employed, the syrup can include about 70 to about 99 parts by weight preferably from about 85 to 99 parts by weight acrylate monomer, with the balance being comonomer. The useful amounts of each type of monomer will vary depending upon the desired properties of the pressure-sensitive adhesive and the choice of acrylate and comonomer. For example, when the comonomer is strongly polar, such as acrylic acid or methacrylic acid, a preferred range of comonomer is about 1 to about 15 parts by weight comonomer per 100 parts acrylate monomer and comonomer.

Crosslinking Agent

The adhesive syrup may also contain a crosslinking agent to reduce the dose required to achieve adequate crosslinking and/or to further control crosslinking of the adhesive. Useful crosslinking agents include but are not limited to those selected from the group consisting of acrylic or methacrylic esters of diols such as butanediol diacrylate, hexanediol diacrylate, triols such as trimethylolpropane triacrylate, and tetrols such as pentaerythritol acrylate. Other useful crosslinking agents include but are not limited to those selected from the group consisting of polyvinylic crosslinking agents, such as substituted and unsubstituted divinyl benzene, triallylcyanurate and triallyl isocyanurate, di-functional urethane acrylate, such as Ebecryl 270 and Ebecryl 230 (1500 and 5000 weight average molecular weight acrylate urethanes, respectively, both available from Radcure Specialties), and mixtures thereof. When used, the adhesive syrup can typically include up to about 1 parts per hundred (pph), preferably less than about 0.3 pph crosslinking agent. The crosslinking agent can be added at any time prior to coating of the adhesive syrup.

Free-Radical Yielding Agent

A free-radical yielding agent capable of efficiently capturing and transferring energy from a higher state to a lower state may optionally be admixed with the monomer(s). The presence of a free-radical yielding agent can improve the rate of polymerization. Suitable free-radical yielding agents are those capable of providing a high yield of free-radicals, capable of providing a sensitizing effect upon acrylate-type monomers, and having a high transfer constant in chain radical reactions. Particularly suitable for use in the present invention are halogenated aliphatic hydrocarbons, exemplified by chlorinated saturated $C_{1-3}$ lower alkanes such as methylene chloride, chloroform, carbon tetrachloride, 1,2-dichloroethane, 1,1-dichlorethane and trichlorobenzene. The effect of the halogenated hydrocarbon is best produced at levels ranging from 0.01 to 5 wt % and preferably 0.1 to 1 wt %.

Additives

Typical pressure-sensitive adhesive additives, such as age resistors, antioxidants, fibrous reinforcing agents, fillers, fire retardants, foaming agents, opacifiers, pigments, plasticizers, rheological modifiers, softeners, solvents, stabilizers, tackifiers, ultraviolet protectants, etc., may be incorporated in the adhesive in the proportions conventionally employed.

Tackifiers

A tackifier can be added to the pressure-sensitive adhesive syrup for purposes of facilitating coating of the adhesive syrup onto a support prior to polymerization and/or enhancing the adhesive properties of the resultant pressure-sensitive adhesive. Generally useful tackifiers are those that do not contain a significant amount of aromatic structure.

Suitable tackifiers include polymerized terpene resins, cumarone-indene resins, phenolic resins, rosins, and hydrogenated rosins. The adhesive composition can include about 5 to 50 wt % tackifier. Addition of less than about 5 wt % tackifier provides little enhancement in the adhesive strength of the composition, while addition of greater than about 50 wt % reduces both the cohesiveness and the adhesive strength of the composition.

Physical Form

Solventless Blend or Mixture

The adhesive syrup can include a solvent for purposes of facilitating mixing, but is preferably a solvent-free or nearly solvent-free composition of a liquid acrylate-type monomer (s) and any desired copolymerizable monomers. For selected adhesive syrups, it is generally preferred to incorporate about 5%-10% of a natural plasticizing solvent, such as water, to adjust the viscosity of the composition and enhance the generation of free-radicals upon e-beam irradiation of the composition.

E-Beam Source

Electron beams (e-beams) are generally produced by applying high voltage to tungsten wire filaments retained between a repeller plate and an extractor grid within a vacuum chamber maintained at about $10^{-6}$ Torr. The filaments are heated at high current to produce electrons. The electrons are guided and accelerated by the repeller plate and extractor grid towards a thin window of metal foil. The accelerated electrons, traveling at speeds in excess of $10^7$ meters/second (m/sec) and possessing about 150 to 300 kilo-electron volts (keV), pass out of the vacuum chamber through the foil window and penetrate into whatever material is positioned immediately below the window.

The quantity of electrons generated is directly related to the extractor grid voltage. As extractor grid voltage is increased, the quantity of electrons drawn from the tungsten wire filaments increases. E-beam processing can be extremely precise when under computer control, such that an exact dose and dose rate of electrons can be directed against the adhesive syrup.

Electron beam generators are commercially available from a variety of sources, including the ESI "ELECTROCURE" EB SYSTEM available from Energy Sciences, Inc. of Wilmington, Mass., and the BROADBEAM EB PROCESSOR available from RPC Industries of Hayward, Calif.

For any given piece of equipment and irradiation sample location, the dosage delivered can be measured in accordance with ASTM E-1275 entitled "Practice for Use of a Radiochromic Film Dosimetry System." By altering extractor grid voltage, beam diameter and/or distance to the source, various dose rates can be obtained.

Process Parameters

Temperature

Superior adhesive properties and high conversion can be achieved by cooling the adhesive syrup to a temperature below 20° C., preferably below 1 0C and most preferably below 5° C., during e-beam polymerization of the monomers. The temperature is preferably maintained between about −80° C. to 10° C. and most preferably between about 0 to 5° C. Without intending to be limited to any particular mechanism, it is believed that by conducting e-beam polymerization at temperatures below 20° C., the rate of polymer chain propagation is increasingly favored over the rate of termination, with the effect of producing polymers with a higher gel content and higher conversion.

The temperature of the adhesive syrup can be maintained at the desired temperature during polymerization by a variety of techniques, such as introducing chilled nitrogen gas into the radiation chamber, placing the coated adhesive syrup upon a cooling plate, or use of any other type of heat sink.

Residence Time

In a free radical polymerization, the rate of initiation determines the concentration of radicals. The rate of termination is generally proportional to the concentration of radicals, with a comparatively large number of terminations at high radical concentrations. This results in lower molecular weight and a lower conversion of monomer to polymer. The rate of initiation resulting from electron beam can be controlled, so as to achieve high conversion, by decreasing the flux of electrons (current) and increasing the residence time under the beam to accumulate the desired dose. Residence time can be increased by lowering the speed of transit under the beam or increasing the area of irradiance under the beam. In order to achieve high conversion of monomer to polymer (i.e., greater than about 90%) at the dose levels specified herein, a residence time of about 2 to 20 seconds will generally be required.

A number of different methods can be employed to provide the desired dose and residence time. One method employs a shuttle system communicating with an on-off switch for the electron beam generator that causes the adhesive syrup to remain stationary under the e-beam window until the desired dose of electron beam energy has been deposited. A second method employs a continuously moving conveyor belt to move the adhesive syrup under the e-beam window at a speed calculated to deposit the desired dose of electron beam energy onto the syrup within the desired residence time. A third method moves a continuous web of the syrup past an array of electron beam generators operated and positioned to provide a substantially uniform dose of electron beam energy across an extended surface area of the web. This third method can achieve the desired residence time at a web speed suitable for economical processing.

Dose

Dose is the total amount of energy deposited per unit mass. Dose is commonly expressed in Megarads (Mrads) or kilograys (kGy). A rad is defined as the amount of radiation required to supply 100 ergs of energy per gram of mass, with a megarad comprising $10^6$ rads. A kilogray is defined as the amount of radiation required to supply 1 joule of energy per kilogram of mass. Megarads can be converted to kilograys according to the equation kGy=(10)(Mrad).

The total dose received by the adhesive syrup primarily affects the extent to which monomer is converted to polymer and the extent to which the polymers are crosslinked. In general, it is desirable to convert at least 95 wt %, preferably 99.5 wt %, of the monomers to polymer. However, the conversion of monomers to polymer in a solventless or low solvent system is asymptotic as the reaction progresses due to diffusion limitations inherent in such systems. As monomer concentration is depleted it becomes increasingly difficult to further polymerize the diffusion-limited monomers. However, without intending to be limited to any particular theory, it is believed that by controlling the temperature of the adhesive syrup below 20° C. during e-beam polymerization, the diffusion limitation effect is more pronounced for the chain-extending polymers than the monomers and/or oligomers remaining in the system, with the effect of producing a greater decrease in polymer to polymer chain terminating contact than in polymer to monomer/oligomer chain extending contact (e.g., chances of a polymer contacting a monomer/oligomer is increased relative to the chances of a polymer contacting another polymer).

Dose is dependent upon a number of processing parameters, including voltage, speed and beam current. Dose can be conveniently regulated by controlling line speed (i.e., the speed with which the adhesive syrup passes under the e-beam window), and the current supplied to the extractor grid. A target dose (e.g., 20 kGy) can be conveniently calculated by multiplying an experimentally measured coefficient (a machine constant) by the beam current and dividing by the web speed to determine the exposure. The machine constant varies as a function of beam voltage.

While the appropriate dosage is dependent upon the residence time, as a general matter, an adhesive syrup will generally be significantly cured (i.e., >90% conversion of monomers to polymers) upon receiving a total dose of greater than about 20 kGy, and filly cured (i.e., 95% to 99.9% conversion of monomers to polymers) upon receiving a total dose of greater than about 40 kGy. At total doses of less than about 20 kGy, polymerization tends to be incomplete, resulting in poor adhesive properties and low conversion. At the other extreme, total doses of greater than about 100 kGy produce a fully cured polymer, but tend to produce a polymer which is excessively crosslinked, again resulting in poor adhesive properties.

Dose Rate

Dose rate is the dose (energy per unit mass) deposited per unit time. Dose rate is conveniently expressed in megarads per minute (Mrads/min) or kilograys per second (kGy/min) wherein kGy/sec=(10)(Mrads/min)/(60 sec/min).

Generally, e-beam polymerization of the adhesive syrup is preferably effected within the dose and residence time ranges set forth above at dose rates of between about 1 to about 30 kGy/sec, most preferably between about 4 to about 15 kGy/sec.

Inert Atmosphere

E-beam irradiation of the adhesive syrup is preferably carried out in the presence of minimal amounts of oxygen, which is known to inhibit free-radical polymerization. Hence, E-beam irradiation of the adhesive syrup should be conducted in an inert atmosphere such as nitrogen, carbon dioxide, helium, argon, etc. Polymerization is preferably conducted, for example, in a nitrogen atmosphere containing up to about 3,000 parts per million (ppm) oxygen, preferably up to 1,000 ppm oxygen, and more preferably 50 to 300 ppm to obtain the most desirable adhesive properties. The concentration of oxygen can conveniently be measured by an oxygen analyzer.

Oxygen can also be substantially excluded by sandwiching the adhesive syrup between solid sheets of material (e.g., a tape backing and a release liner) and irradiating the adhesive syrup through the sheet material.

Coating

Coating Techniques

The adhesive syrup can be coated onto a substrate prior to polymerization by any conventional coating means. Suitable coating techniques include such common techniques as spray coating, curtain coating, solvent casting, latex casting, calendaring, knife coating, doctor blade coating, roller coating, two-roller coating, reverse roller coating, electrostatic coating and extrusion die coating.

It is generally desirable to polymerize the adhesive syrup directly on an end-use substrate. For instance, the adhesive syrup can be coated onto a substrate and then subjected to e-beam radiation so as to form a layer of pressure-sensitive adhesive adherently bonded to the substrate. Adhesive syrup thicknesses of from about 10 to 500 microns (0.4 to 20 mils) can be conveniently polymerized in accordance with the process described herein. Adhesive syrup thickness of up to about 1,000 microns (40 mils) can be conveniently polymerized in those situations where the syrup can be irradiated on both sides. Quality control becomes a significant issue with adhesive syrup layers having a thickness of less than 10 microns (0.4 mil) due to the potential for significant changes in the relative thickness of the layer resulting from selective evaporation. On the other hand, it becomes increasingly difficult to provide consistent levels of polymerization through the entire thickness of adhesive syrup layers which are more than about 500 microns (20 mils) thick due to the limited penetration capabilities of a low voltage e-beam of less than about 300 keV. However, the resultant high residual content can be reduced by the subsequent evaporation of residuals from the cured adhesive. In addition, it becomes increasingly difficult to maintain the appropriate temperature throughout the thickness of the adhesive syrup layer at thicknesses greater than about 500 microns (20 mils) due to the greater amount of heat generated during polymerization and the slower transfer of heat from the central portion of the adhesive syrup layer.

The adhesive syrup can be conveniently coated by conventional coating techniques, such as knife coating and roll coating, at viscosities of between about 500 to 40,000 centipoise. When the resultant polymerized pressure-sensitive adhesive has a viscosity in excess of about 40,000 centipoise, the adhesive composition can be conveniently coated by extrusion or die coating techniques.

The viscosity of the adhesive syrup can be increased to allow the composition to retain a desired coating thickness prior to polymerization. Such an increase in viscosity can be achieved by any of the conventional techniques, including removal of solvent, cooling, effecting partial polymerization of the adhesive syrup, and/or adding thickeners to the adhesive syrup. However, when adding a thickener, care must be taken to ensure that the thickener is not significantly interfering with polymerization, and that the residence time, total dose and/or polymerization temperature are adjusted as appropriate to accommodate inclusion of the thickener. A generally preferred technique for increasing the viscosity of the adhesive syrup is to prepolymerize approximately 1 to 15 wt %, most preferably about 4 to 7 wt %, of the monomers in the adhesive syrup.

Suitable thickening agents are those which are soluble in the adhesive syrup, and generally include oligomeric and polymeric materials. Such materials can be selected to contribute various desired adhesive properties or characteristics to the pressure-sensitive adhesive. Examples of suitable polymeric thickening agents include copolymers of ethylene and vinyl esters or ethers, poly(alkyl acrylates), poly(alkyl methacrylates), polyesters such as poly(ethylene maleate), poly(propylene fumarate), poly(propylene phthalate), and the like.

Other types of thickening agents may be used to good advantage include finely divided silica, fumed silica such as CAB-O-SIL, alumina and the like.

Substrate

A wide variety of substrates can be used, so long as the substrate is not degraded by electron beam irradiation. Suitable substrates include metals, such as aluminum foil, copper foil, tin foil, and steel panels; plastic films, such as films of polyvinyl chloride, polyethylene, polypropylene, polyethylene terephthalate, nylon, polyesters, polystyrene, polycarbonates, polyphenylene oxides, polyimides, polyvinyl fluoride, polyvinylidene fluoride and polytetrafluoroethylene; metalized plastics; cellulosics such as paper and wood; and fabrics such as woven and non-woven cotton, nylon and wool and synthetic non-wovens. The pressure-sensitive adhesive can be utilized in an adhesive tape, wherein the adhesive is formed on a thin, flexible backing sheet material, or in the construction of a surgical adhesive dressing, wherein the adhesive is formed on a moisture vapor transmissive backing sheet. The adhesive may also be used as a laminating binder or provided as a supported or unsupported film.

An additional advantage provided by effecting e-beam curing of the adhesive syrup directly upon the end-use substrate is the ability of e-beam irradiation to create reactive sites in both the adhesive syrup and the substrate so as to cause chemical bonding between the adhesive and the substrate at the interface of these two layers, thereby grafting the adhesive to the substrate and eliminating the need to prime or otherwise treat the substrate prior to coating.

Pressure-Sensitive Adhesive
Properties and Characteristics

Pressure-sensitive adhesives produced in accordance with the process described herein can possess superior adhesive properties and characteristics, including good shear strength and peel adhesion, with high conversion. Generally, acrylate pressure-sensitive adhesives can be produced having a peel adhesion of at least 25 N/dm, frequently over 55 N/dm, and a shear strength of at least 300 minutes, frequently over 10,000 minutes, with a conversion of greater than about 90 wt %, frequently greater than about 97 wt %. In addition, pressure-sensitive adhesives can be produced having a gel content of greater than 80 wt %, frequently greater than 95 wt %.

This invention is further illustrated by the following examples which are not intended to limit the scope of the invention.

Experimental

Testing Procedures

The test methods used to measure the peel adhesion, shear strength, conversion and gel content reported herein are set forth below. Samples tested for peel adhesion and shear strength were placed in an oven set at 65° C. for 80 minutes and then conditioned by allowing the samples to rest for at least 12 hours in a controlled environment with the temperatures maintained at 22° C. and the relative humidity maintained at 50%.

Peel Adhesion

Peel adhesion is the force required to remove an adhesive coated strip of a flexible sheet material from a test panel at a specific angle and rate of removal. This force is measured in oz/½in width of the coated strip and converted to N/dm width of the coated strip.

Step 1: A 12.7 mm wide pressure-sensitive adhesive tape strip having a length of at least 12 cm is applied to the horizontal surface of a clean glass test plate with a 4½ lb (2.1 kg) hard rubber roller moved at a speed of 230 cm/min. The strip is applied so that one end of the tape strip remains free.

Step 2: The free end of the tape strip is doubled back upon itself, so that the angle of removal will be 180°, and the free end attached to the adhesion scale of a Model 3M90 slip/peel tester, available from Instrumentors, Inc.

Step 3: The tape strip is pulled from the glass plate at an angle of approximately 1800 at a constant speed of 230 cm/min (90 in/min).

Step 4: The scale reading is recorded as the tape strip is peeled from the glass surface. The peel strength is reported as the reading of a single sample measurement or the average of two sample measurements. Cohesive failure resulting in some adhesive from the sample transferring to the test surface is indicated by a "t." Samples for which the adhesive is so stiff that it does not adhere uniformly to the test surface are referred to as is "shocky" and are indicated by an "s."

Shear Holding Strength

Shear strength is a measure of the cohesiveness or internal strength of an adhesive based upon the force required to pull an adhesive strip from a standard flat surface in a direction parallel to the surface to which it has been affixed with a definite pressure. Shear strength is measured in terms of the minutes required to pull a standard area of an adhesive coated sheet material from a stainless steel test panel when the sheet is subjected to a constant stress created by a standard load.

The temperature of the tape can impact the shear holding strength of the pressure-sensitive adhesive. Hence, both ambient temperature (22°–25° C.) and high temperature (70° C.) shear strength testing was conducted. When measuring ambient temperature shear strength, the pressure-sensitive adhesive tape is maintained at ambient temperatures (i.e., 22–25° C.) and at a relative humidity of 50% throughout the testing procedure. When measuring high temperature shear strength, the pressure-sensitive adhesive tape is heated at 70° C. for 10 minutes in an oven after it is applied to the plate, and maintained in the oven at 70° C. and 50% relative humidity throughout the testing procedure. A brief review of the balance of the testing procedure used for both ambient temperature and high temperature shear strength testing is set forth below.

Step 1: A 12.7 mm wide pressure-sensitive adhesive tape strip is applied to the horizontal surface of a stainless steel panel. The tape strip is applied to the panel with a 4½ lb (2.1 kg) hard rubber roller using 6 passes. The strip is applied so that a 12.7 mm length of the tape strip is in firm adhesive contact with the panel while one end of the tape strip remains free.

Step 2: The stainless steel panel is clamped to a rack, tilted 2° from vertical, and the free end of the strip doubled back upon itself so that the angle of removal will be about 178°.

Step 3: A 1 kg weight is attached to the free end of the strip and allowed to hang freely under force of gravity.

Step 4: The time required in minutes for the strip to completely separate from the panel is recorded and reported as the shear strength. Testing of a sample was terminated at 10,000 minutes. A second sample was tested only for selected samples having a shear strength of less than 10,000 minutes. When multiple samples were tested, the results of both tests are reported.

Step 5: The mode of failure is observed as cohesive or adhesive. All samples exhibiting an adhesive failure wherein virtually no adhesive was observed on the steel test panel are referred to as "pop-off" failure and are marked as "po." All unmarked samples exhibited cohesive failure mode unless the test was terminated at 10,000 minutes without an observed failure.

Conversion

The adhesive syrup to be tested is coated on a substrate and irradiated. The polymerized adhesive layer is then covered with a release liner and placed in a sealed plastic bag until tested. A 6.5 cm² sample is die-cut from the irradiated substrate and the release liner removed and discarded. The uncovered sample is weighed (Sample $Wt_{Before}$), placed in an oven for 2 hours at 1 000C, and then weighed again (Sample $Wt_{After}$). A 6.5 cm² sample of uncoated substrate is also die-cut and weighed (Substrate Wt). The percent conversion (%Conv) is calculated in accordance with the equation provided below. Reported values are for a single measurement, with an estimated error of ±0.5 % for % conversions of greater than 98%, and increasing to ±10% for % conversions of less than 50%.

% Conv=(Sample $Wt_{After}$–Substrate Wt)(100)/(Sample $Wt_{Before}$–Substrate Wt)

Gel Content

A known weight of polymer (Initial Weight) to be tested is submerged in an excess of ethyl acetate, allowed to equilibrate for 24 hours, and then decanted into a liquid fraction and a gelled fraction. The gelled fraction is dried for one hour at 60° C. and weighed (Crosslinked Weight). The gel content (% gel) is calculated in accordance with the equation provided below. Reported values are for a single measurement, with an estimated standard deviation of ±1 %.

% Gel=(Crosslinked Weight)(100)/(Initial Weight)

Glossary

The following acronyms, abbreviations, and trade names are used throughout the Examples.

| ACRONYM OR TRADENAME | DESCRIPTION | |
|---|---|---|
| | Full Name | Type |
| AA | Acrylic Acid | (an acrylate monomer) |
| AEROSIL R972 | AEROSIL R972 | (a hydrophobic filmed silica thickening agent available from DeGussa.) |
| CAB-O-SIL M-5 | CAB-O-SIL M-5 | (a hydrophobic filmed silica thickening agent available from Cabot Corp.) |
| EHA | 2-Ethyl Hexyl Acrylate | (an alkyl acrylate monomer) |
| ELVACITE 2045 | n-butyl methacrylate | (a thickening agent available from E. I. DuPont deNemours) |
| HDODA | 1,6-Hexanedioldiacrylate | (a crosslinking agent) |
| IBnA | Isobornyl Acrylate | (an alkyl acrylate monomer) |
| IOA | Isooctyl Acrylate | (an alkyl acrylate monomer) |
| IRGACURE 651 | 2,2 Dimethoxy-2-Phenyl Acetophenone | (a photoinitiator available from Ciba-Geigy) |
| LA | Lauryl Acrylate | (an alkyl acrylate monomer) |
| OACM | Octylacrylamide | (an acrylate amine monomer) |
| pODA | Polyoctadecylacrylate | (a thickening agent) |
| TDA | Tridecyl Acrylate | (an alkyl acrylate monomer) |
| TMPTA | Trimethylolpropanetriacrylate | (a crosslinking agent) |
| NVP | N-Vinyl Pyrrolidone | (a vinyl monomer) |

EXAMPLES

Experiment I

Examples 1–15
(Effect of $O_2$ Upon Adhesive Properties)
(Without Crosslinker)

Procedure An adhesive precursor composition of 90 wt % IOA and 10 wt % AA containing 0.04 pph IRGACURE 651 was partially photopolymerized in an inert nitrogen atmosphere using a 15-watt GE fluorescent black light to form a coatable adhesive syrup having a Brookfield viscosity of about 1500 cp.

The syrup was coated with a knife coater onto a 35 μm thick chemically treated polyester backing at a coating thickness of either 50 or 75 μm. The coated polyester backing was cut into approximately 15 cm by 15 cm square samples and supported on a copper plate resting upon an ice-filled shuttle tray. The samples were maintained at a temperature of approximately 1° C. throughout the irradiation process, with the trays generally repacked with ice for each sample. The coatings were polymerized "open-faced" (i.e., no cover film).

Each cooled sample was introduced through a system of interlocked doors into the shielded ante-chamber of a CB-1 75 ELECTROCURTAIN accelerated electron source manufactured by Energy Sciences, Inc. of Wilmington, Mass. To effectively obtain the low processing speeds desired, the CB-175 was modified with a 50:1 ratio gear box. An indicated accelerating potential of 175 kV was applied to the cathode. A target dose of 40 kGy and target residence time of 5 seconds were obtained at a dose rate of 8 kGy/sec by adjusting the potentiometers that controlled the tray speed and the current level. The tray speed was 1.2 meters per minute (4 fpm). The current level was 0.45 mA comprised of the 0.2 mA potentiometer setting and the indicated leakage current of 0.25 mA. The dose rate was calculated based on the average dose over a distance of 10 cm of exposure.

The CB-175 was further modified by adding an air bleed valve into the irradiation chamber and an oxygen analyzer. A gaseous mixture of nitrogen and air was pumped into the irradiation chamber and the concentration of oxygen in the gaseous mixture was continuously measured with a Delta F Oxygen Analyzer purchased from Delta F Corporation of Woburn, Mass. The concentration of oxygen in the gaseous mixture being pumped into the irradiation chamber for each sample was varied from 6 ppm to 1000 ppm as reported in Table 1.

The shear strength, peel adhesion, conversion and gel content of each irradiated sample was determined in accordance with the general procedures set forth above and recorded. The polymerized thickness of the adhesive coating was measured with a micrometer. The recorded values are reported in Table 1.

Reported Results

TABLE 1

[Without Crosslinker]

| Example Number | Oxygen (ppm) | Polymerized Thickness (microns) | Conversion (wt %) | Gel (wt %) | Peel Adhesion (N/dm) [oz/½ in] | Shear $1^{st}/2^{nd}$ Samples (minutes) |
|---|---|---|---|---|---|---|
| 1 | 6 | 53 | 97.9 | 70 | 68.8 [31.4] | 916/1700 po |
| 2 | 24–50 | 48 | 98.1 | 70 | 76.9 [35.1] | 1,725/7,451 po |
| 3 | 40–50 | 43 | 98.3 | 68 | 78.0 [35.6] | 4,620 po/10,000+ |
| 4 | 63–70 | 47 | 97.4 | 67 | 86.5 [39.5] | 10,000+ |
| 5 | 83–90 | 43 | 99.0 | 72 | 78.4 [35.8] | 10,000+ |
| 6 | 103–110 | 41 | 91.6 | 58 | 82.1 [37.5] | 10,000+ |
| 7 | 120–136 | 55 | 96.3 | 68 | 82.3 [37.6] | 10,000+ |
| 8 | 138–151 | 43 | 97.1 | 69 | 78.8 [36.0] | 10,000+ |
| 9 | 160–180 | 41 | 97.5 | 67 | 85.6 [39.1] | 1,358 po/10,000+ |
| 10 | 175–194 | 35 | 88.5 | 53 | 83.7 [38.2] | 10,000+ |
| 11 | 196–216 | 47 | 93.3 | 62 | 82.3 [37.6] | 10,000+ |
| 12 | 300–310 | 41 | 93.7 | 61 | 79.9 [36.5] | 10,000+ |
| 13 | 380–420 | 35 | 94.5 | 63 | 85.6 [39.1] | 696 po/10,000+ |
| 14 | 500–540 | 35 | 94.3 | 61 | 87.4 [39.9] | 871 po/10,000+ |
| 15 | 1000 | 33 | 89.4 | 56 | 76.2 [34.8] | 10,000+ |

Conclusions

As seen in Table 1, the concentration of oxygen in the atmosphere during e-beam polymerization can affect the adhesive properties of the resultant polymer. With respect to the specific IOA/AA adhesive syrup tested, high peel strengths, high shear strengths and high conversions were observed at oxygen concentrations above about 50 ppm. When the oxygen concentration was controlled within a range between about 50 and 180 ppm, the polymerized pressure-sensitive adhesive generally had a conversion of greater than 97 wt %, exhibited a peel adhesion over 78 N/dm [35 oz/½ in] and a shear strength over 10,000 minutes.

Experiment II

Examples 16–30

(Effect of $O_2$ Upon Adhesive Properties)
(With Crosslinker)

Procedure

The pressure-sensitive adhesive was prepared in accordance with the procedure described in EXPERIMENT I except that 0.3 pph HDODA was added to the partially polymerized syrup, and the composition shaken for about an hour before being irradiated. The HDODA containing syrup was then coated, sampled, irradiated, and tested as set forth in EXPERIMENT I, with the recorded results reported in Table 2.

Reported Results

TABLE 2

[With Crosslinker]

| Example Number | Oxygen (ppm) | Polymerized Thickness (microns) | Conversion (wt %) | Gel (wt %) | Peel Adhesion (N/dm) [oz/½ in] | Shear $1^{st}/2^{nd}$ Samples (minutes) |
|---|---|---|---|---|---|---|
| 16 | 6 | 47 | 99.3 | 92 | 66.6 [30.4] | 1,220/6,896 po |
| 17 | 20–30 | 39 | 98.8 | 93 | 72.1 [32.9] | 10,000+ |
| 18 | 40–50 | 51 | 97.4 | 90 | 69.4 [31.7] | 10,000+ |
| 19 | 63–70 | 51 | 98.6 | 91 | 71.0 [32.4] | 10,000+ |
| 20 | 83–90 | 45 | 98.0 | 91 | 70.7 [32.3] | 10,000+ |
| 21 | 103–110 | 41 | 92.8 | 85 | 78.8 [36.0] | 10,000+ |
| 22 | 120–136 | 51 | 98.3 | 92 | 75.6 [34.5] | 3,335 po/10,000+ |
| 23 | 138–151 | 43 | 98.1 | 91 | 76.2 [34.8] | 10,000+ |
| 24 | 160–180 | 49 | 98.6 | 92 | 76.2 [34.8] | 10,000+ |
| 25 | 175–194 | 45 | 96.3 | 90 | 81.0 [37.0] | 10,000+ |
| 26 | 196–216 | 41 | 98.6 | 91 | 82.8 [37.8] | 10,000+ |
| 27 | 300–310 | 39 | 91.9 | 83 | 79.0 [36.1] | 10,000+ |
| 28 | 380–420 | 41 | 91.9 | 82 | 77.5 [35.4] | 10,000+ |
| 29 | 500–540 | 31 | 92.4 | 82 | 73.6 [33.6] | 10,000+ |
| 30 | 1000 | 39 | 90.2 | 80 | 78.6 [35.9] | 10,000+ |

Conclusions

As seen in Tables 1 and 2, the incorporation of a crosslinking agent can significantly increase gel % without substantially changing the general effect of oxygen concentration upon the adhesive properties of the resultant polymer, other than to broaden the range of oxygen concentrations at which balanced adhesive properties were observed. With respect to the specific IOA/AA adhesive syrup tested and HDODA crosslinking agent used, balanced adhesive properties were observed at oxygen concentrations between about 20 and 220 ppm. When the oxygen concentration was controlled within that range, the polymerized pressure-sensitive adhesive generally had a conversion of greater than 97 wt % and exhibited a peel adhesion over 74 N/dm [34 oz/½ in] and a shear strength over 7500 minutes. Without intending to be limited to any theory, it is believed that the variability of the measured adhesive properties within this range is attributable to selective evaporation of the AA monomer for those examples in which the time between coating and polymerization was extended, a variable which was not recorded.

Experiment III

Examples 31–90
(Effect of Dose, Dose Rate and Temperature Upon Residual Content)
(With Crosslinker)

Procedure The pressure-sensitive adhesive syrup was prepared and coated in accordance with the procedure described in EXPERIMENT II. The coated samples were then irradiated under a nitrogen/oxygen atmosphere at the oxygen concentrations, conveyor speeds, residence times, total doses, dose rates, and adhesive syrup temperatures reported in Table 3. The conversion of monomers in the adhesive syrups were tested in accordance with the general procedures set forth herein and recorded. The recorded values are reported in Table 3a. The shear strength, peel adhesion, and gel content for selected samples was determined in accordance with the general procedures set forth herein and recorded. The recorded values are reported in Table 3b.

Reported Results

TABLE 3a

[Processing Parameter, % Conversion and Thickness of Adhesive Layer]

| | | Processing Parameters | | | | % Conversion @ Adhesive Syrup Temperature | | | | Adhesive Layer Thickness |
|---|---|---|---|---|---|---|---|---|---|---|
| Example Number | Oxygen (ppm) | Conveyor Speed (mpm) [fpm] | Dose Rate (kGy/sec) | Residence Time (sec) | Dose (kGy) | −78° C.[1] | 1° C.[2] | 23° C.[3] | 42° C.[4] | (μm) |
| 31 | 6 | 0.61 [2] | 1 | 10 | 10 | 74.8 | — | — | — | 34.3 |
| 32 | 6 | 0.61 [2] | 1 | 10 | 10 | — | 64.1 | — | — | 22.1 |
| 33 | 6 | 0.61 [2] | 1 | 10 | 10 | — | — | 72.6 | — | 12.5 |
| 34 | 6 | 0.61 [2] | 1 | 10 | 10 | — | — | — | 64.7 | 20.3 |
| 35 | 6 | 0.61 [2] | 2 | 10 | 20 | 99.6 | — | — | — | 27.9 |
| 36 | 6 | 0.61 [2] | 2 | 10 | 20 | — | 93.0 | — | — | 29.2 |
| 37 | 6 | 0.61 [2] | 2 | 10 | 20 | — | — | 81.0 | — | 20.3 |
| 38 | 6 | 0.61 [2] | 2 | 10 | 20 | — | — | — | 80.1 | 19.1 |
| 39 | 6 | 0.61 [2] | 3 | 10 | 30 | 100 | — | — | — | 29.2 |
| 40 | 6 | 0.61 [2] | 3 | 10 | 30 | — | 98.8 | — | — | 34.3 |
| 41 | 6 | 0.61 [2] | 3 | 10 | 30 | — | — | 92.2 | — | 20.3 |
| 42 | 6 | 0.61 [2] | 3 | 10 | 30 | — | — | — | 84.9 | 17.8 |
| 43 | 6 | 0.61 [2] | 4 | 10 | 40 | 100 | — | — | — | 25.0 |
| 44 | 6 | 0.61 [2] | 4 | 10 | 40 | — | 98.8 | — | — | 35.6 |

TABLE 3a-continued

[Processing Parameter, % Conversion and Thickness of Adhesive Layer]

| Example Number | Oxygen (ppm) | Conveyor Speed (mpm) [fpm] | Dose Rate (kGy/sec) | Residence Time (sec) | Dose (kGy) | % Conversion @ Adhesive Syrup Temperature | | | | Adhesive Layer Thickness (μm) |
|---|---|---|---|---|---|---|---|---|---|---|
| | | | | | | −78° C.[1] | 1° C.[2] | 23° C.[3] | 42° C.[4] | |
| 45 | 6 | 0.61 [2] | 4 | 10 | 40 | — | — | 91.0 | — | 20.3 |
| 46 | 6 | 0.61 [2] | 4 | 10 | 40 | — | — | — | 88.7 | 34.3 |
| 47 | 6 | 1.2 [4] | 2 | 5 | 10 | 53.8 | — | — | — | 12.5 |
| 48 | 6 | 1.2 [4] | 2 | 5 | 10 | — | 58.7 | — | — | 25.4 |
| 49 | 6 | 1.2 [4] | 2 | 5 | 10 | — | — | 54.4 | — | 16.5 |
| 50 | 6 | 1.2 [4] | 2 | 5 | 10 | — | — | — | 56.0 | 14.0 |
| 51 | 6 | 1.2 [4] | 4 | 5 | 20 | 89.5 | — | — | — | 22.1 |
| 52 | 6 | 1.2 [4] | 4 | 5 | 20 | — | 68.3 | — | — | 22.1 |
| 53 | 6 | 1.2 [4] | 4 | 5 | 20 | — | — | 72.2 | — | 24.1 |
| 54 | 6 | 1.2 [4] | 4 | 5 | 20 | — | — | — | 65.6 | 15.2 |
| 55 | 6 | 1.2 [4] | 6 | 5 | 30 | 90.9 | — | — | — | 26.7 |
| 56 | 6 | 1.2 [4] | 6 | 5 | 30 | — | 92.3 | — | — | 25 |
| 57 | 6 | 1.2 [4] | 6 | 5 | 30 | — | — | 80.1 | — | 25.4 |
| 58 | 6 | 1.2 [4] | 6 | 5 | 30 | — | — | — | 73.9 | 21.6 |
| 59 | 6 | 1.2 [4] | 8 | 5 | 40 | 100 | — | — | — | 24.1 |
| 60 | 6 | 1.2 [4] | 8 | 5 | 40 | — | 98.2 | — | — | 34.3 |
| 61 | 6 | 1.2 [4] | 8 | 5 | 40 | — | — | 86.1 | — | 21.6 |
| 62 | 6 | 1.2 [4] | 8 | 5 | 40 | — | — | — | 79.8 | 20.3 |
| 63 | 6 | 1.2 [4] | 10 | 5 | 50 | 100 | — | — | — | 31.8 |
| 64 | 6 | 1.2 [4] | 10 | 5 | 50 | — | 98.9 | — | — | 36.8 |
| 65 | 6 | 1.2 [4] | 10 | 5 | 50 | — | — | 91.8 | — | 21.6 |
| 66 | 6 | 1.2 [4] | 10 | 5 | 50 | — | — | — | 84.1 | 15.2 |
| 67 | 50 | 0.6 [2] | 1 | 10 | 10 | 54.9 | — | — | — | — |
| 68 | 50 | 0.6 [2] | 1 | 10 | 10 | — | 47.2 | — | — | — |
| 69 | 50 | 0.6 [2] | 1 | 10 | 10 | — | — | — | — | — |
| 70 | 50 | 0.6 [2] | 1 | 10 | 10 | — | — | — | — | — |
| 71 | 50 | 0.6 [2] | 2 | 10 | 20 | 96.1 | — | — | — | — |
| 72 | 50 | 0.6 [2] | 2 | 10 | 20 | — | 91.2 | — | — | — |
| 73 | 50 | 0.6 [2] | 2 | 10 | 20 | — | — | — | — | — |
| 74 | 50 | 0.6 [2] | 2 | 10 | 20 | — | — | — | — | — |
| 75 | 50 | 0.6 [2] | 3 | 10 | 30 | 98.2 | — | — | — | — |
| 76 | 50 | 0.6 [2] | 3 | 10 | 30 | — | 97.4 | — | — | — |
| 77 | 50 | 0.6 [2] | 3 | 10 | 30 | | — | — | — | — |
| 78 | 50 | 0.6 [2] | 3 | 10 | 30 | | — | — | — | — |
| 79 | 50 | 1.2 [4] | 4 | 10 | 20 | 84.4 | — | — | — | — |
| 80 | 50 | 1.2 [4] | 4 | 5 | 20 | — | 44.1 | — | — | — |
| 81 | 50 | 1.2 [4] | 4 | 5 | 20 | — | — | — | — | — |
| 82 | 50 | 1.2 [4] | 4 | 5 | 20 | — | — | — | — | — |
| 83 | 50 | 1.2 [4] | 6 | 5 | 30 | 91.6 | — | — | — | — |
| 84 | 50 | 1.2 [4] | 6 | 5 | 30 | — | 81.7 | — | — | — |
| 85 | 50 | 1.2 [4] | 6 | 5 | 30 | — | — | — | — | — |
| 86 | 50 | 1.2 [4] | 6 | 5 | 30 | — | — | — | — | — |
| 87 | 50 | 1.2 [4] | 8 | 5 | 40 | 97.7 | — | — | — | — |
| 88 | 50 | 1.2 [4] | 8 | 5 | 40 | — | 96.3 | — | — | — |
| 89 | 50 | 1.2 [4] | 8 | 5 | 40 | — | — | — | — | — |
| 90 | 50 | 1.2 [4] | 8 | 5 | 40 | — | — | — | — | — |

[1]Cooled with dry ice.
[2]Cooled with ice.
[3]Irradiated under adiabatic conditions with an average starting temperature of about 23° C.
[4]Sample placed upon an aluminum block preheated to about 42° C.

TABLE 3b

[Percent Gel, Peel Adhesion and Shear Strength]

| Example Number | Percent Gel @ Monomer Temperature | | | | Peel Adhesion @ Monomer Temperature (N/dm)/[oz/½ in] | | | | Shear Strength @ Monomer Temperature 1st/2nd Samples (minutes) | | | |
|---|---|---|---|---|---|---|---|---|---|---|---|---|
| | −78° C.[1] | 1° C.[2] | 23° C.[3] | 42° C.[4] | −78° C.[1] | 1° C.[2] | 23° C.[3] | 42° C.[4] | −78° C.[1] | 1° C.[2] | 23° C.[3] | 42° C.[4] |
| 31 | 69.83 | — | — | — | 58.7 [26.8] | — | — | — | 519 po/ 10,000+ | — | — | — |
| 32 | — | 61.22 | — | — | — | 73.4 [33.5] | — | — | — | 10,000+ | — | — |

TABLE 3b-continued

[Percent Gel, Peel Adhesion and Shear Strength]

| Example Number | Percent Gel @ Monomer Temperature | | | | Peel Adhesion @ Monomer Temperature (N/dm)/[oz/½ in] | | | | Shear Strength @ Monomer Temperature 1st/2nd Samples (minutes) | | | |
|---|---|---|---|---|---|---|---|---|---|---|---|---|
| | −78° C.[1] | 1° C.[2] | 23° C.[3] | 42° C.[4] | −78° C.[1] | 1° C.[2] | 23° C.[3] | 42° C.[4] | −78° C.[1] | 1° C.[2] | 23° C.[3] | 42° C.[4] |
| 33 | — | — | 64.95 | — | — | — | 66.4 [30.3] | — | — | — | 85/ 160 po | — |
| 34 | — | — | — | 56.96 | — | — | — | 49.3 [22.5] | — | — | — | 21/ 39 po |
| 35 | 93.71 | — | — | — | 58.5 [26.7] | — | — | — | 3,557/ 3,596 po | — | — | — |
| 36 | — | 88.82 | — | — | — | 59.6 [27.2] | — | — | — | 10,000+ | — | — |
| 37 | — | — | 74.03 | — | — | — | 57.8 [26.4] | — | — | — | 33/ 2,507 po | — |
| 38 | — | — | — | 72.45 | — | — | — | 48.2 [22.0] | — | — | — | 25/ 210 po |
| 39 | 92.56 | — | — | — | 51.5 [23.5] | — | — | — | 1,555/ 5,971 po | — | — | — |
| 40 | — | 94.07 | — | — | — | 81.0 [37.0] | — | — | — | 340/ 1,887 po | — | — |
| 41 | — | — | 85.28 | — | — | — | 55.2 [25.2] | — | — | — | 57/ 64 po | — |
| 42 | — | — | — | 77.48 | — | — | — | 49.1 [22.4] | — | — | — | 48/ 63 po |
| 43 | 92.01 | — | — | — | 44.0 [20.1] | — | — | — | 45/ 335 po | — | — | — |
| 44 | — | 91.36 | — | — | — | 80.8 [36.9] | — | — | — | 10,000+ | — | — |
| 45 | — | — | 83.01 | — | — | — | 51.5 [23.5] | — | — | — | 681/ 847 po | — |
| 46 | — | — | — | 80.82 | — | — | — | 41.8 [19.1] | — | — | — | 22/ 26 po |
| 47 | 50.01 | — | — | — | 59.3 [27.1] | — | — | — | 10,000+ | — | — | — |
| 48 | — | 46.46 | — | — | — | 74.2 [33.9] | — | — | — | 10,000+ | — | — |
| 49 | — | — | 44.41 | — | — | — | 66.8 [30.5] | — | — | — | 10,000+ | — |
| 50 | — | — | — | 43.70 | — | — | — | 68.1 [31.1] | — | — | — | 37/ 41 po |
| 51 | 79.45 | — | — | — | 59.1 [27.0] | — | — | — | 10,000+ | — | — | — |
| 52 | — | 58.10 | — | — | — | 70.5 [32.2] | — | — | — | 10,000+ | — | — |
| 53 | — | — | 61.45 | — | — | — | 72.2 [33.0] | — | — | — | 1,425/ 3,965 po | — |
| 54 | — | — | — | 55.33 | — | — | — | 53.2 [24.3] | — | — | — | 32/ 34 po |
| 55 | 86.52 | — | — | — | 53.4 [24.4] | — | — | — | 339/ 10,000+ | — | — | — |
| 56 | — | 83.88 | — | — | — | 69.2 [31.6] | — | — | — | 10,000+ | — | — |
| 57 | — | — | 68.55 | — | — | — | 72.2 [33.0] | — | — | — | 1,489/ 1,919 po | — |
| 58 | — | — | — | 61.51 | — | — | — | 50.6 [23.1] | — | — | — | 23/ 26 |
| 59 | 89.89 | — | — | — | 56.1 [25.6] | — | — | — | 1,073/ 1,864 po | — | — | — |
| 60 | — | 90.24 | — | — | — | 66.1 [30.2] | — | — | — | 3,527/ 5,712 po | — | — |
| 61 | — | — | 72.50 | — | — | — | 61.3 [28.0] | — | — | — | 688/ 1,546 po | — |
| 62 | — | — | — | 67.81 | — | — | — | 58.0 [26.5] | — | — | — | 28/ 31 po |
| 63 | 89.49 | — | — | — | 55.8 [25.5] | — | — | — | 1,301/ 1,494 | — | — | — |
| 64 | — | 91.11 | — | — | — | 63.9 [29.2] | — | — | — | 3,845/ 3,954 po | — | — |

TABLE 3b-continued

[Percent Gel, Peel Adhesion and Shear Strength]

| Example | Percent Gel @ Monomer Temperature | | | | Peel Adhesion @ Monomer Temperature (N/dm)/[oz/½ in] | | | | Shear Strength @ Monomer Temperature 1st/2nd Samples (minutes) | | | |
|---|---|---|---|---|---|---|---|---|---|---|---|---|
| Number | −78° C.[1] | 1° C.[2] | 23° C.[3] | 42° C.[4] | −78° C.[1] | 1° C.[2] | 23° C.[3] | 42° C.[4] | −78° C.[1] | 1° C.[2] | 23° C.[3] | 42° C.[4] |
| 65 | — | — | 82.61 | — | — | — | 53.2 [24.3] | — | — | — | 244/ 616 po | — |
| 66 | — | — | — | 69.00 | — | — | — | 45.8 [20.0] | — | — | — | 52/ 76 po |

[1]Cooled with dry ice.
[2]Cooled with ice.
[3]Irradiated under adiabatic conditions with an average starting temperature of about 23° C.
[4]Sample placed upon an aluminum block preheated to about 42° C.

Conclusions

As seen in Table 3a, conversion can be influenced by the temperature of the adhesive syrup during e-beam polymerization. When the dose was insufficient to effect substantial conversion of monomer to polymer, the temperature of the adhesive syrup had limited effect upon the extent of conversion. However, at doses sufficient to effect substantially complete conversion of monomer to polymer, the temperature effect became more pronounced, with the lower temperatures resulting in a higher level of conversion. It is further noted that as the dose rate increased, higher doses were required to maintain a high conversion.

As seen in Table 3b, the gel content of the pressure-sensitive adhesive can be influenced by the temperature of the adhesive syrup during e-beam polymerization, with the gel content generally increasing as the polymerization temperature decreased. Similarly, the shear strength can be influenced by the temperature of the adhesive syrup during e-beam polymerization, with the shear strength generally optimized at a polymerization temperature between -78° C. and 23° C. Temperature was found to have little effect upon the peel adhesion of the pressure-sensitive adhesive, with a modest decrease generally observed at the extreme polymerization temperature of −78° C.

Experiment IV

Examples 91–116
(Effect of Dose and Dose Rate Upon Adhesive Properties)
(With Crosslinker)

Procedure

The pressure-sensitive adhesive was prepared in accordance with the procedure described in EXPERIMENT II except that 0.2 pph TMPTA was added to the prepolymerized thickened syrup instead of 0.3 pph HDODA. The adhesive syrup was then coated onto a substrate at the thicknesses reported in Table 4, and irradiated under a nitrogen/oxygen atmosphere having an oxygen concentration of 40–70 ppm within the irradiation chamber at the residence times, dose rates, total doses and adhesive syrup temperatures also reported in Table 4. The adhesive properties of peel adhesion and shear strength of the polymerized pressure-sensitive adhesive samples were tested in accordance with the general procedures set forth herein and recorded.

Polymerization was effected at residence times of between about 1 to 160 seconds and total doses ranging from 5 to 80 kGy using dose rates ranging from 0.125 to 29 kGy/sec.

The relationship between residence time, total dose and dose rate is provided below.

Equation 1:

$$\text{Total Dose (kGy)} = (\text{Dose Rate (kGy/sec)}) * (\text{Residence Time (sec)})$$

When irradiation of a sample is effected by conveying the sample at a known speed under an e-beam window with an area of irradiation of known length on the web plane in the machine direction, then residence time can be calculated using the general equation set forth below.

Equation 2:

$$\text{Residence Time (sec)} = (\text{Length of Irradiation Area(cm)})/(\text{Conveyor Speed (cm/sec)})$$

The dose rates of 0.125 to 1 kGy/sec were achieved by leaving the sample stationary under the electron beam window and delivering that dose of e-beam energy resulting from the low leakage current generated when a high voltage potential of approximately 175 kV was applied to the terminal. The dose rates were varied between 0.125 and 1 kGy/sec by supplying additional small increments of current to the leakage current and timing the exposure. The configuration of the beam pathway resulted in an irradiated sample having a dose distribution across the width of the sample, with a central portion about 2.5 cm wide receiving the targeted dose. This central portion was separated from the balance of the sample and was tested for adhesive properties. Dose rates of between about 3 kGy/sec and about 7 kGy/sec were obtained as in Experiment I. Dose rates of between about 15 kGy/sec and about 29 kGy/sec were achieved on a continuously moving web with the web speed and current levels adjusted as necessary to achieve the targeted dose.

Reported Results

TABLE 4

[With Crosslinker]

| Example Number | Temp (° C.) | Residence Time (sec) | Dose Rate (kGy/sec) | Dose (kGy) | Thickness (microns) | Peel Adhesion (N/dm) [oz/½ in] | Shear 1st/2nd Samples (minutes) |
|---|---|---|---|---|---|---|---|
| 91 | 1[2] | 160 | 0.125 | 20 | 55 | 77.3 [35.3] | 10,000+ |
| 92 | 1[2] | 80 | 0.25 | 20 | 51 | 73.4 [33.5] | 10,000+ |
| 93 | 1[2] | 160 | 0.25 | 40 | 73 | 80.6 [36.8] | 10,000+ |
| 94 | 1[2] | 20 | 0.25 | 5 | 37 | 44.9 [20.5] | 1050/1512 po |
| 95 | 23[3] | 20 | 0.25 | 5 | 33 | 59.3 [27.1] | 196/254 |
| 96 | 1[2] | 20 | 1 | 20 | 43 | 45.3 [20.7] | 6778 po |
| 97 | 23[3] | 20 | 1 | 20 | 55 | 53.0 [24.2] | 112/156 |
| 98 | 1[2] | 7.5 | 2.7 | 20 | 67 | 74.7 [34.1] | 10,000+ |
| 99 | 1[2] | 15 | 2.7 | 40 | 63 | 65.9 [30.1] | 10,000+ |
| 100 | 1[2] | 22.5 | 2.7 | 60 | 63 | 71.4 [32.6] | 10,000+ |
| 101 | 1[2] | 20 | 3 | 60 | 53 | 60.7 [27.7] | 10,000+ |
| 102 | 23[3] | 20 | 3 | 60 | 45 | 52.3 [23.9] | 10,000+ |
| 103 | 1[2] | 20 | 4 | 80 | 53 | 51.7 [23.6] | 10,000+ |
| 104 | 23[3] | 20 | 4 | 80 | 57 | 51.7 [23.6] | 10,000+ |
| 105 | 1[2] | 2.8 | 7 | 20 | 59 | 71.8 [32.8] | 10,000+ |
| 106 | 1[2] | 5.7 | 7 | 40 | 146 | 68.8 [31.4] | 10,000+ |
| 107 | 1[2] | 8.6 | 7 | 60 | 128 | 56.7 [25.9] | 2000 |
| 108 | 1[2] | 11.4 | 7 | 80 | 108 | 54.8 [25.0] | 10,000+ |
| 109 | 23[3] | 2.8 | 7 | 20 | 59 | 67.2 [30.7] | 10,000+ |
| 110 | 23[3] | 5.7 | 7 | 40 | 85 | 59.8 [27.3] | 1250 |
| 111 | 23[3] | 8.6 | 7 | 60 | 30 | 55.2 [25.2] | 600 |
| 112 | 23[3] | 11.4 | 7 | 80 | 98 | 42.9 [19.6] | 120 |
| 113 | 23[3] | 2.8 | 7 | 20 | 39 | 55.8 [25.5] | 1070 |
| 114 | 23[3] | 5.7 | 7 | 40 | 39 | 64.6 [29.5] | 6290 |
| 115 | 23[3] | 2.67 | 15 | 40 | 39 | 56.7 [25.9] | 672 |
| 116 | 23[3] | 1.4 | 29 | 40 | 27 | 51.0 [23.3] | 222 |

[1]Cooled with dry ice.
[2]Cooled with ice.
[3]COMPARATIVE EXAMPLE: Irradiated under adiabatic conditions with an average starting temperature of about 23° C.

Conclusions

As seen in Table 4, the dose rate and dose used to polymerize the $C_{8-13}$ alkyl acrylate adhesive syrup can significantly impact the adhesive properties of the polymerized acrylate pressure-sensitive adhesive. Acrylate pressure-sensitive adhesives having superior peel adhesion and shear can be produced over a broad range of low dose rates and low doses when the temperature of the adhesive syrup is cooled below ambient temperatures. At higher dose rates, the temperature of the adhesive syrup had a more pronounced effect upon the adhesive properties of the resultant pressure-sensitive adhesive. For the particular adhesive syrup tested (i.e., 90 wt % IOA: 10 wt % AA) shear strength fell precipitously when the dose rate was over 10 kGy/sec and polymerization was conducted under adiabatic conditions, even for thinner coatings.

Experiment V

Examples 117–172
(Effect of Residence Time and Temperature Upon Adhesive Properties)
(With Crosslinker)

Procedure

The pressure-sensitive adhesive syrup was prepared in accordance with the procedure described in Experiment IV. The adhesive syrup was then coated onto a substrate at the coating thicknesses reported in Table 5, and irradiated under a nitrogen/oxygen atmosphere having an oxygen concentration of 40–70 ppm within the irradiation chamber at the residence times, dose rates, total doses and adhesive syrup temperatures also reported in Table 5. The % conversion, gel content and adhesive properties of peel adhesion and shear strength of the polymerized pressure-sensitive adhesive samples were tested in accordance with the general procedures set forth herein and recorded.

Polymerization was effected at residence times of 2½, 3⅓, 5 and 10 seconds and total doses ranging from 25 to 75 kGy using dose rates ranging from 2 to 30 kGy/sec. The samples were irradiated on a continuously moving web, with the web speed selected and maintained to achieve the targeted residence time, and the current levels adjusted as necessary to achieve the desired total dose.

Reported Results

TABLE 5

[Residual Content, Percent Gel, Peel Adhesion and Shear Strength]

| | Processing Parameters | | | | | Percent Conversion @ Monomer Temperature | | Percent Gel @ Monomer Temperature | | Peel Adhesion @ Monomer Temperature (N/dm) [oz/½ in] | | Shear Strength @ Monomer Temperature 1st/2nd Samples (min) | |
|---|---|---|---|---|---|---|---|---|---|---|---|---|---|
| Example Number | Residence Time (sec) | Speed (mpm) [ft/min] | Dose Rate (kGy/sec) | Dose (kGy) | Thickness (μm) | −78° C.[1] | 0° C.[2] | −78° C.[1] | 0° C.[2] | −78° C.[1] | 0° C.[2] | −78° C.[1] | 0° C.[2] |
| 117 | 10 | 0.61 [2] | 2.67 | 26.7 | 33 | 97.62 | — | 93.20 | — | 59.3 [27.1] | — | 10,000+ | — |
| 118 | 10 | 0.61 [2] | 2.67 | 26.7 | 33 | — | 98.32 | — | 95.39 | — | 65.3 [29.8] | — | 10,000+ |
| 119 | 10 | 0.61 [2] | 2.93 | 29.3 | 30.5 | 96.32 | — | 90.87 | — | 43.1 [19.7] | — | 414/ 4,860 po | — |
| 120 | 10 | 0.61 [2] | 2.93 | 29.3 | 30.5 | — | 98.29 | — | 94.68 | — | 60.9 [27.8] | — | 10,000+ |
| 121 | 10 | 0.61 [2] | 3.67 | 36.7 | 27.9 | 98.03 | — | 90.78 | — | 61.8 [28.2] | — | 10,000+ | — |
| 122 | 10 | 0.61 [2] | 3.67 | 36.7 | 27.9 | — | 98.21 | — | 94.41 | — | 64.6 [29.5] | — | 10,000+ |
| 123 | 10 | 0.61 [2] | 3.82 | 38.2 | 43.2 | 98.8 | — | 93.77 | — | 66.6 [30.4] | — | 1,018/ 4,554 po | — |
| 124 | 10 | 0.61 [2] | 3.82 | 38.2 | 43.2 | — | 98.93 | — | 94.51 | — | 67.7 [30.9] | — | 10,000+ |
| 125 | 10 | 0.61 [2] | 5.04 | 50.4 | 30.5 | 97.71 | — | 93.31 | — | 55.4 [25.3] | — | 440/ 224 po | — |
| 126 | 10 | 0.61 [2] | 5.04 | 50.4 | 30.5 | — | 99.22 | — | 95.05 | — | 71.2 [32.5] | — | 10,000+ |
| 127 | 10 | 0.61 [2] | 5.25 | 52.5 | 40.6 | 98.5 | — | 91.32 | — | 53.0 [24.2] | — | 2,934/ 762 po | — |
| 128 | 10 | 0.61 [2] | 5.25 | 52.5 | 40.6 | — | 99.27 | — | 96.04 | — | 74.7 [34.1] | — | 10,000+ |
| 129 | 10 | 0.61 [2] | 6.34 | 63.4 | 35.6 | 98.53 | — | 91.91 | — | 52.6 [24.0] | — | 28/ 164 po | — |
| 130 | 10 | 0.61 [2] | 6.34 | 63.4 | 35.6 | — | 99.37 | — | 95.07 | — | 73.4 [33.5] | — | 10,000+ |
| 131 | 10 | 0.61 [2] | 7.51 | 75.1 | 27.9 | 98.01 | — | 91.99 | — | 46.6 [21.3] | — | 1,605/ 2,367 po | — |
| 132 | 10 | 0.61 [2] | 7.51 | 75.1 | 27.9 | — | 98.88 | — | 94.90 | — | 55.8 [25.5] | — | 4,138 to 490 |
| 133 | 5 | 1.2 [4] | 5.16 | 25.8 | 25.4 | 96.52 | — | 91.37 | — | 56.7 [25.9] | — | 10,000+ | — |
| 134 | 5 | 1.2 [4] | 5.16 | 25.8 | 25.4 | — | 85.36 | — | 79.81 | — | 68.3 [31.2] | — | 10,000+ |
| 135 | 5 | 1.2 [4] | 5.18 | 25.9 | 23.6 | 95.14 | — | 88.96 | — | 54.8 [25.0] | — | 10,000+ | — |
| 136 | 5 | 1.2 [4] | 5.18 | 25.9 | 23.6 | — | 87.60 | — | 81.43 | — | 62.6 [28.6] | — | 10,000+ |
| 137 | 5 | 1.2 [4] | 6.22 | 31.1 | 24.9 | 97.30 | — | 90.82 | — | 60.9 [27.8] | — | 10,000+ | — |
| 138 | 5 | 1.2 [4] | 6.22 | 31.1 | 24.9 | — | 95.61 | — | 90.33 | — | 74.2 [33.9] | — | 10,000+ |
| 139 | 5 | 1.2 [4] | 7.50 | 37.5 | 23.1 | 98.06 | — | 91.22 | — | 55.8 [25.5] | — | 65/ 1,122 po | — |
| 140 | 5 | 1.2 [4] | 7.50 | 37.5 | 23.1 | — | 98.65 | — | 93.15 | — | 64.6 [29.5] | — | 10,000+ |
| 141 | 5 | 1.2 [4] | 7.96 | 39.8 | 33.0 | 98.73 | — | 89.76 | — | 55.6 [25.4] | — | 10,000+ | — |
| 142 | 5 | 1.2 [4] | 7.96 | 39.8 | 33.0 | — | 98.63 | — | 92.17 | — | 73.1 [33.4] | — | 10,000+ |
| 143 | 5 | 1.2 [4] | 9.72 | 48.6 | 35.6 | 98.59 | — | 89.55 | — | 54.8 [25.0] | — | 452/ 3,515 po | — |
| 144 | 5 | 1.2 [4] | 9.72 | 48.6 | 35.6 | — | 98.54 | — | 92.10 | — | 70.5 [32.2] | — | 10,000+ |
| 145 | 5 | 1.2 [4] | 12.08 | 60.4 | 33.0 | 98.32 | — | 87.95 | — | 55.6 [25.4] | — | 257/ 263 po | — |
| 146 | 5 | 1.2 [4] | 12.08 | 60.4 | 33.0 | — | 98.55 | — | 91.22 | — | 59.6 [27.2] | — | 10,000+ |
| 147 | 5 | 1.2 [4] | 13.96 | 69.8 | 27.9 | 98.46 | — | 89.62 | — | 53.4 [24.4] | — | 362/ 253 po | — |
| 148 | 5 | 1.2 [4] | 13.96 | 69.8 | 27.9 | — | 99.04 | — | 92.94 | — | 63.3 [28.9] | — | 10,000+ |
| 149 | 3.33 | 1.8 [6] | 9.06 | 30.2 | 22.1 | 94.12 | — | 88.07 | — | 53.2 [24.3] | — | 4,032/ 38 po | — |

TABLE 5-continued

[Residual Content, Percent Gel, Peel Adhesion and Shear Strength]

| Example Number | Processing Parameters | | | | | Percent Conversion @ Monomer Temperature | | Percent Gel @ Monomer Temperature | | Peel Adhesion @ Monomer Temperature (N/dm) [oz/½ in] | | Shear Strength @ Monomer Temperature 1st/2nd Samples (min) | |
|---|---|---|---|---|---|---|---|---|---|---|---|---|---|
| | Residence Time (sec) | Speed (mpm) [ft/min] | Dose Rate (kGy/sec) | Dose (kGy) | Thickness (μm) | −78° C.[1] | 0° C.[2] | −78° C.[1] | 0° C.[2] | −78° C.[1] | 0° C.[2] | −78° C.[1] | 0° C.[2] |
| 150 | 3.33 | 1.8 [6] | 9.06 | 30.2 | 22.1 | — | 83.03 | — | 75.92 | — | 77.5 [35.4] | — | 10,000+ |
| 151 | 3.33 | 1.8 [6] | 11.22 | 37.4 | 24.9 | 97.85 | — | 89.18 | — | 36.1 [16.5] | — | 3,441/ 59 po | — |
| 152 | 3.33 | 1.8 [6] | 11.22 | 37.4 | 24.9 | — | 93.11 | — | 86.63 | — | 75.7 [34.3] | — | 10,000+ |
| 153 | 3.33 | 1.8 [6] | 12.18 | 40.6 | 33.0 | 95.58 | — | 87.74 | — | 53.9 [24.6] | — | 10,000+ | — |
| 154 | 3.33 | 1.8 [6] | 12.18 | 40.6 | 33.0 | — | 92.01 | — | 83.97 | — | 67.5 [30.8] | — | 10,000+ |
| 155 | 3.33 | 1.8 [6] | 14.94 | 49.8 | 30.5 | 98.20 | — | 89.62 | — | 55.8 [25.5] | — | 10,000+ | — |
| 156 | 3.33 | 1.8 [6] | 14.94 | 49.8 | 30.5 | — | 96.30 | — | 88.64 | — | 67.9 [31.0] | — | 10,000+ |
| 157 | 3.33 | 1.8 [6] | 17.46 | 58.2 | 33.0 | 98.94 | — | 89.22 | — | 55.6 [25.4] | — | 8,336/ 297 po | — |
| 158 | 3.33 | 1.8 [6] | 17.46 | 58.2 | 33.0 | — | 98.96 | — | 89.12 | — | 66.8 [30.5] | — | 10,000+ |
| 159 | 3.33 | 1.8 [6] | 20.34 | 67.8 | 33.0 | 98.17 | — | 88.55 | — | 49.9 [22.8] | — | 296/ 258 po | — |
| 160 | 3.33 | 1.8 [6] | 20.34 | 67.8 | 33.0 | — | 98.55 | — | 88.73 | — | — | 58.0 [26.5] | — | 869/ 94 po |
| 161 | 2.5 | 2.4 [8] | 12.92 | 32.3 | 20.1 | 88.64 | — | 81.27 | — | 51.0 [23.3] | — | 10,000+ | — |
| 162 | 2.5 | 2.4 [8] | 12.92 | 32.3 | 20.1 | — | 70.00 | — | 60.19 | — | 67.5 [30.8] | — | 10,000+ |
| 163 | 2.5 | 2.4 [8] | 16.08 | 40.2 | 25.4 | 87.53 | — | 79.17 | — | 40.5 [18.5] s, x | — | 6,247/ 1,666 po | — |
| 164 | 2.5 | 2.4 [8] | 16.08 | 40.2 | 25.4 | — | 86.89 | — | 77.95 | — | 41.8 [19.1] | — | 1,120/ 855 po |
| 165 | 2.5 | 2.4 [8] | 17.12 | 42.8 | 20.1 | 94.53 | — | 86.50 | — | 70.5 [32.2] | — | 10,000+ | — |
| 166 | 2.5 | 2.4 [8] | 17.12 | 42.8 | 20.1 | — | 77.89 | — | 66.20 | — | 67.2 [30.7] | — | 10,000+ |
| 167 | 2.5 | 2.4 [8] | 20.44 | 51.1 | 27.9 | 91.67 | — | 83.15 | — | 32.2 [17.9] s, x | — | 587/ 227 po | — |
| 168 | 2.5 | 2.4 [8] | 20.44 | 51.1 | 27.9 | — | 93.04 | — | 84.70 | — | 46.4 [21.2] s, x | — | 10,000+ |
| 169 | 2.5 | 2.4 [8] | 23.08 | 57.7 | 27.9 | 98.41 | — | 88.95 | — | 32.2 [14.7] s, x | — | 58/ 1,101 po | — |
| 170 | 2.5 | 2.4 [8] | 23.08 | 57.7 | 27.9 | — | 97.18 | — | 88.00 | — | 42.9 [19.6] s, x | — | 10,000+ |
| 171 | 2.5 | 2.4 [8] | 27.32 | 68.3 | 30.5 | 95.79 | — | 86.18 | — | 32.4 [14.8] s, x | — | 99/ 13 po | — |
| 172 | 2.5 | 2.4 [8] | 27.32 | 68.3 | 30.5 | — | 98.21 | — | 90.11 | — | 19.4 8.87] | — | 1,044/ 874 po |

[1]Cooled with dry ice.
[2]Cooled with ice.

Conclusions

As seen in Table 5, adhesives having balanced conversion, peel strength and shear strength values can be obtained over a broad range of processing parameters. The range of processing parameters resulting in an adhesive with balanced adhesive properties can be extended through the use of a crosslinking agent. As a general matter, the test results show that balanced adhesive properties can be achieved at residence times of greater than 2½ seconds, with an indication that the adhesive properties begin to deteriorate when the residence time is less than 2½ seconds.

Experiment VI

Examples 173–196
(Effect of Type and Concentration of Crosslinker Upon Conversion and Adhesive Properties)

Procedure

The pressure-sensitive adhesive syrup was prepared in accordance with the procedure described in Experiment II, except that various concentrations of HDODA or TMPTA, as reported in Table 6, were added to the prepolymerized syrup. The syrups were then coated onto a substrate at the coating thicknesses reported in Table 6, and irradiated under a nitrogen/oxygen atmosphere having an oxygen concentration of 40–70 ppm within the irradiation chamber at the residence times, dose rates, and total doses also reported in Table 6. The % conversion and the adhesive properties of peel adhesion, shear strength and high-temperature shear strength of the polymerized pressure-sensitive adhesive samples were tested in accordance with the general procedures set forth herein and recorded. The recorded values are reported in Table 6.

Reported Results coater at a coating thickness of 50 or 75 Jim onto a primed polyester backing and covered with a second primed polyester film. The sandwiched construction was cut into approximately 15 cm by 15 cm square samples and supported on a copper plate. The samples were maintained at temperatures of 1° C. (ice bath), 23° C. (adiabatic), or 40° C. (copper plate preheated to 400C) throughout the irradiation process. The coatings were polymerized "closed-faced" (i.e., covered with a polyester film) to limit possible evaporation of volatile monomers.

Each sample was introduced through a system of interlocked doors into the shielded ante-chamber of a CB-175

TABLE 6

| | | | Processing Parameters | | | | | Adhesive Properties | | |
|---|---|---|---|---|---|---|---|---|---|---|
| Example | Crosslinker | | Dose Rate | Residence Time | Dose | Thickness | Conversion | Peel Adhesion (N/dm) | Shear $1^{st}/2^{nd}$ Sample | HT Shear $1^{st}/2^{nd}$ Sample |
| Number | Type | pph | (kGy/sec) | (sec) | (kGy) | (microns) | (wt %) | [oz/½ in] | (minutes) | (minutes) |
| 173 | T | 0.1 | 1 | 2 | 2 | 70 | 97.8 | 68.5 [31.3] | 10,000+ | 10,000+ |
| 174 | T | 0.1 | 1 | 4 | 4 | 57 | 98.1 | 53.7 [24.5] | 10,000+ | 10,000+ |
| 175 | T | 0.3 | 1 | 2 | 2 | 57 | 98.5 | 58.5 [26.7] | 10,000+ | 10,000+ |
| 176 | T | 0.3 | 1 | 4 | 4 | 63 | 98.3 | 40.1 [18.3] | 10,000+ | 10,000+ |
| 177 | H | 0.1 | 1 | 2 | 2 | 61 | 99.1 | 76.7 [35.0] | 10,000+ | 10,000+ |
| 178 | H | 0.1 | 1 | 4 | 4 | 70 | 98.8 | 71.6 [32.7] | 10,000+ | 10,000+ |
| 179 | H | 0.3 | 1 | 2 | 2 | 75 | 98.7 | 63.1 [28.8] | 10,000+ | 10,000+ |
| 180 | H | 0.3 | 1 | 4 | 4 | 79 | 99.0 | 52.3 [23.9] | 10,000+ | 10,000+ |
| 181 | T | 0.1 | 3.7 | 0.54 | 2 | 47 | 68.1 | 71.4 [32.6] | 10,000+ | 10,000+ |
| 182 | T | 0.1 | 3.7 | 1.08 | 4 | 49 | 99.0 | 49.9 [22.8] | 617/6170 po | 39 po |
| 183 | T | 0.3 | 3.7 | 0.54 | 2 | 53 | 90.1 | 78.2 [35.7] | 10,000+ | — |
| 184 | T | 0.3 | 3.7 | 1.08 | 4 | 79 | 99.3 | 68.3 [31.2] | 10,000+ | 10,000+ |
| 185 | H | 0.1 | 3.7 | 0.54 | 2 | 61 | 91.7 | 75.1 [34.3] | 10,000+ | 10,000+ |
| 186 | H | 0.1 | 3.7 | 1.08 | 4 | 63 | 99.7 | 66.1 [30.2] | 10,000+ | 160 po |
| 187 | H | 0.3 | 3.7 | 0.54 | 2 | 59 | 71.3 | 72.3 [33.0] | 10,000+ | 10,000+ |
| 188 | H | 0.3 | 3.7 | 1.08 | 4 | 63 | 99.2 | 52.3 [23.9] | 10,000+ | — |
| 189 | T | 0.1 | 7.3 | 0.27 | 2 | 35 | 54.9 | 53.0 [24.2] | 10,000+ | 79 |
| 190 | T | 0.1 | 7.3 | 0.55 | 4 | 65 | 98.7 | 58.3 [26.6] | 10,000+ | 10,000+ |
| 191 | T | 0.1 | 7.3 | 0.82 | 6 | 43 | 95.8 | 43.1 [19.7] | 10,000+ | 10,000+ |
| 192 | T | 0.1 | 7.3 | 1.11 | 8 | 51 | 99.0 | 48.0 [21.9] | 10,000+ | 10,000+ |
| 193 | T | 0.3 | 7.3 | 0.55 | 4 | 39 | 97.1 | 49.1 [22.4] | 10,000+ | 10,000+ |
| 194 | H | 0.1 | 7.3 | 0.55 | 4 | 43 | 96.7 | 58.5 [26.7] | 10,000+ | 10,000+ |
| 195 | H | 0.1 | 7.3 | 0.82 | 6 | 47 | 98.3 | 53.9 [24.6] | 10,000+ | 10,000+ |
| 196 | H | 0.3 | 7.3 | 0.55 | 4 | 55 | 98.9 | 55.6 [25.4] | 7210/7208 po | 10,000+ |

H = HDODA
T = TMPTA

Conclusions

As seen in Table 6, the type and concentration of crosslinking agent as between HDODA and TMPTA resulted in only modest changes in the % conversion and adhesive properties of the resultant pressure-sensitive adhesive.

Experiment VII

Examples 197–206
(Effect of Type and Concentration of Thickening Agent Upon Residual Content and Gel Content)
[Covered]

Procedure An adhesive syrup comprised of 90 parts IOA and 10 parts AA, thickened with the type and amount of thickening agent listed in Table 7, was coated with a knife ELECTROCURTAIN accelerated electron source manufactured by Energy Sciences, Inc. of Wilmington, Mass. An indicated accelerating potential of 175 kV was applied to the cathode. The target residence time and/or total dose were obtained by adjusting the potentiometers that controlled the tray speed and the current level. The residence time was calculated on the basis of a 10 cm "footprint."

The % conversion and gel content of the irradiated samples was determined in accordance with the general procedures set forth herein and recorded. The recorded values are reported in Table 7.

Reported Results

TABLE 7

| Example Number | Adhesive Syrup Monomers Type | Adhesive Syrup Monomers Parts/wt | Adhesive Syrup Thickening Agent Type | Adhesive Syrup Thickening Agent wt % | x-linker[1] pph | Processing Parameters Temp °C. | Processing Parameters Resident Time (sec) | Processing Parameters Speed (mpm) [ft/min] | Processing Parameters Dose Rate (kGy/sec) | Processing Parameters Dose (kGy) | Conversion (wt %) | Gel (wt %) |
|---|---|---|---|---|---|---|---|---|---|---|---|---|
| 197 | IOA AA | 90 10 | pODA | 4 | 0.05 | 0[2] | 10 | 0.61 [2] | 6 | 60 | 99.7 | 85.8 |
| 198 | IOA AA | 90 10 | pODA | 4 | 0.05 | 23[3] | 10 | 0.61 [2] | 6 | 60 | 96.1 | 81.6 |
| 199 | IOA AA | 90 10 | pODA | 4 | 0.05 | 40[4] | 10 | 0.61 [2] | 6 | 60 | 89.9 | 72.9 |
| 200 | IOA AA | 90 10 | Elvacite | — | 0.3 | 0[2] | 10 | 0.61 [2] | 4 | 40 | 59.9 | 14.9 |
| 201 | IOA AA | 90 10 | Elvacite | — | 0.3 | 0[2] | 10 | 0.61 [2] | 6 | 60 | 82.2 | 70.4 |
| 202 | IOA AA | 90 10 | Elvacite | — | 0.3 | 23[3] | 10 | 0.61 [2] | 6 | 60 | 98.0 | 84.7 |
| 203 | IOA AA | 90 10 | R972 | 7 | 0.3 | 0[2] | 10 | 0.61 [2] | 4 | 40 | 45.8 | 41.7 |
| 204 | IOA AA | 90 10 | R972 | 7 | 0.3 | 0[2] | 10 | 0.61 [2] | 6 | 60 | 97.6 | 93.6 |
| 205 | IOA AA | 90 10 | R972 | 7 | 0.3 | 23[3] | 10 | 0.61 [2] | 6 | 60 | 96.7 | 91.7 |
| 206 | IOA AA | 90 10 | cab-O-sil | 0.4 | — | 0[2] | 5 | 1.2 [4] | 8 | 40 | 61.2 | 58.0 |

[1]HDODA
[2]Cooled with ice.
[3]COMPARATIVE EXAMPLE: Irradiated under adiabatic conditions with an average starting temperature of about 23° C.
[4]COMPARATIVE EXAMPLE: Sample placed upon an aluminum block preheated to about 40° C.

Conclusions

As seen in Table 7, the incorporation of a thickener into the adhesive syrup can impact the thermal sensitivity of the adhesive syrup to e-beam polymerization. Those samples incorporating pODA (Examples 197–199) and R972 (Examples 203–205) continued to exhibit enhanced polymerization at lower temperatures, similar to that observed with prepolymerized syrups, while those samples incorporating Elvacite (Examples 200–202) exhibited enhanced polymerization at the elevated temperatures. High conversion continued to be observed at the lower processing temperature even though the coatings were covered to prevent evaporation.

Experiment VIII

Examples 207–263
(Effect of Residence Time, Dose, Dose Rate and Temperature Upon Residual Content and Adhesive Properties of Various Acrylate Adhesive Syrups)

Procedure

Adhesive syrups containing the types and concentrations of monomers and crosslinker as set forth in Table 8 were polymerized in accordance with the procedure set forth above in connection with EXPERIMENT III.

The % conversion and gel content of the irradiated samples were determined in accordance with the general procedures set forth herein and recorded. The recorded values are reported in Table 8.

Reported Results

TABLE 8

| Example Number | Adhesive Syrup Monomers Type | Adhesive Syrup Monomers Parts/wt | x-linker HDODA pph | Processing Parameters Temp °C. | Processing Parameters Resident Time (sec) | Processing Parameters Speed (mpm) [ft/min] | Processing Parameters Dose Rate (kGy/sec) | Processing Parameters Dose (kGy) | Conversion (wt %) | Gel (wt %) |
|---|---|---|---|---|---|---|---|---|---|---|
| 207 | IOA IBnA | 85 15 | — | 0[2] | 10 | 0.6 [2] | 6 | 60 | 84.9 | 35.7 |
| 208 | IOA IBnA | 85 15 | — | 23[3] | 10 | 0.6 [2] | 6 | 60 | 81.8 | 31.2 |
| 209 | IOA IBnA | 85 15 | — | 40[4] | 10 | 0.6 [2] | 6 | 60 | 79.8 | 27.7 |
| 210 | IOA IBnA | 85 15 | 0.1 | 0[2] | 10 | 0.6 [2] | 6 | 60 | 96.3 | 83.7 |
| 211 | IOA IBnA | 85 15 | 0.1 | 23[3] | 10 | 0.6 [2] | 6 | 60 | 81.9 | 47.1 |
| 212 | IOA IBnA | 85 15 | 0.1 | 40[4] | 10 | 0.6 [2] | 6 | 60 | 80.7 | 46.6 |

TABLE 8-continued

| | | | | Processing Parameters | | | | | | |
|---|---|---|---|---|---|---|---|---|---|---|
| Example Number | Adhesive Syrup Monomers Type | Parts/wt | x-linker HDODA pph | Temp ° C. | Resident Time (sec) | Speed (mpm) [ft/min] | Dose Rate (kGy/sec) | Dose (kGy) | Conversion (wt %) | Gel (wt %) |
| 213 | IOA NVP | 90 10 | 0.3 | $0^2$ | 20 | 0.31 [1] | 3 | 60 | 99.0 | 91.5 |
| 214 | IOA NVP | 90 10 | 0.3 | $23^3$ | 20 | 0.31 [1] | 3 | 60 | 97.8 | 89.9 |
| 215 | IOA NVP | 90 10 | 0.3 | $40^4$ | 20 | 0.31 [1] | 3 | 60 | 97.9 | 90.2 |
| 216 | IOA NVP | 90 10 | 0.3 | $0^2$ | 5 | 1.2 [4] | 8 | 40 | 74.4 | 59.8 |
| 217 | IOA NVP | 90 10 | 0.3 | $23^3$ | 5 | 1.2 [4] | 8 | 40 | 79.5 | 65.8 |
| 218 | IOA NVP | 90 10 | 0.3 | $40^4$ | 5 | 1.2 [4] | 8 | 40 | 80.7 | 66.7 |
| 219 | IOA OACM | 90 10 | — | $0^2$ | 20 | 0.31 [1] | 3 | 60 | 98.3 | 88.9 |
| 220 | IOA OACM | 90 10 | — | $23^3$ | 20 | 0.31 [1] | 3 | 60 | 96.7 | 85.1 |
| 221 | IOA OACM | 90 10 | — | $40^4$ | 20 | 0.31 [1] | 3 | 60 | 96.3 | 84.5 |
| 222 | IOA OACM | 90 10 | — | $0^2$ | 10 | 0.61 [2] | 6 | 60 | 96.3 | 81.7 |
| 223 | IOA OACM | 90 10 | — | $0^2$ | 5 | 1.2 [4] | 8 | 40 | 66.3 | 46.3 |
| 224 | IOA OACM | 90 10 | — | $23^3$ | 5 | 1.2 [4] | 8 | 40 | 68.7 | 51.5 |
| 225 | IOA OACM | 90 10 | — | $40^4$ | 5 | 1.2 [4] | 8 | 40 | 70.1 | 51.2 |
| 226 | IOA AA | 90 10 | 0.3 | $0^2$ | 10 | 0.61 [2] | 6 | 60 | 99.3 | 94.0 |
| 227 | IOA AA | 90 10 | 0.3 | $23^3$ | 10 | 0.61 [2] | 6 | 60 | 97.6 | 92.5 |
| 228 | IOA AA | 90 10 | 0.3 | $40^4$ | 10 | 0.61 [2] | 6 | 60 | 95.4 | 89.5 |
| 229 | IOA AA | 90 10 | 0.3 | $0^2$ | 10 | 0.61 [2] | 4 | 40 | 97.6 | 93.5 |
| 230 | IOA AA | 90 10 | 0.3 | $23^3$ | 10 | 0.61 [2] | 4 | 40 | 93.2 | 86.3 |
| 231 | IOA AA | 90 10 | 0.3 | $40^4$ | 10 | 0.61 [2] | 4 | 40 | 89.3 | 82.8 |
| 232 | IOA AA | 90 10 | 0.3 | $0^2$ | 10 | 0.61 [2] | 4 | 40 | 89.4 | 91.1 |
| 233 | IOA AA | 90 10 | 0.3 | $23^3$ | 10 | 0.61 [2] | 4 | 40 | 84.8 | 79.0 |
| 234 | IOA AA | 90 10 | — | $0^2$ | 10 | 0.61 [2] | 4 | 40 | 96.9 | 71.7 |
| 235 | IOA AA | 90 10 | — | $23^3$ | 10 | 0.61 [2] | 4 | 40 | 92.6 | 64.8 |
| 236 | IOA AA | 90 10 | — | $40^4$ | 10 | 0.61 [2] | 4 | 40 | 86.9 | 48.6 |
| 237 | EHA AA | 90 10 | 0.3 | $-78^1$ | 10 | 0.61 [2] | 4.5 | 45 | 99.05 | 79.4 |
| 238 | EHA AA | 90 10 | 0.3 | $0^2$ | 10 | 0.61 [2] | 7 | 70 | 98.8 | 84.2 |
| 239 | EHA AA | 90 10 | — | $-78^1$ | 5 | 1.2 [4] | 8 | 40 | 90.2 | 57.4 |
| 240 | EHA AA | 90 10 | — | $0^2$ | 5 | 1.2 [4] | 8 | 40 | 97.6 | 69.6 |
| 241 | EHA AA | 90 10 | — | $23^3$ | 5 | 1.2 [4] | 8 | 40 | 93.4 | 64.4 |
| $242^5$ | EHA AA | 90 10 | — | $0^2$ | 10 | 0.61 [2] | 6 | 60 | 99.2 | 77.4 |
| $243^5$ | EHA AA | 90 10 | — | $23^3$ | 10 | 0.61 [2] | 6 | 60 | 97.9 | 75.2 |
| $244^5$ | EHA AA | 90 10 | — | $40^4$ | 10 | 0.61 [2] | 6 | 60 | 95.6 | 71.0 |
| $245^5$ | EHA AA | 90 10 | — | $0^2$ | 5 | 1.2 [4] | 8 | 40 | 87.7 | 57.1 |
| $246^5$ | EHA AA | 90 10 | — | $23^3$ | 5 | 1.2 [4] | 8 | 40 | 83.4 | 51.3 |
| $247^5$ | EHA AA | 90 10 | — | $40^4$ | 5 | 1.2 [4] | 8 | 40 | 81.1 | 47.3 |
| $248^5$ | LA AA | 97 3 | — | $0^2$ | 5 | 1.2 [4] | 12 | 60 | 95.39 | 89 |

TABLE 8-continued

| | | | | Processing Parameters | | | | | | |
|---|---|---|---|---|---|---|---|---|---|---|
| Example Number | Adhesive Syrup Monomers Type | Parts/wt | x-linker HDODA pph | Temp °C. | Resident Time (sec) | Speed (mpm) [ft/min] | Dose Rate (kGy/sec) | Dose (kGy) | Conversion (wt %) | Gel (wt %) |
| 249[5] | LA | 97 | — | 40[4] | 5 | 1.2 [4] | 12 | 60 | 85.02 | 82 |
| | AA | 3 | | | | | | | | |
| 250[5] | LA | 97 | 0.1 | 0[2] | 10 | 0.61 2] | 6 | 60 | 97.10 | 90 |
| | AA | 3 | | | | | | | | |
| 251[5] | LA | 97 | 0.1 | 40[4] | 10 | 0.61 [2] | 6 | 60 | 93.04 | 85 |
| | AA | 3 | | | | | | | | |
| 252[5] | LA | 90 | 0.1 | 0[2] | 10 | 0.61 [2] | 6 | 60 | 98.63 | 94 |
| | AA | 10 | | | | | | | | |
| 253[5] | LA | 90 | 0.1 | 40[4] | 10 | 0.61 [2] | 6 | 60 | 96.89 | 90 |
| | AA | 10 | | | | | | | | |
| 254[5] | LA | 90 | 0.1 | 0[2] | 5 | 1.2 [4] | 12 | 60 | 98.65 | 89 |
| | AA | 10 | | | | | | | | |
| 255[5] | LA | 90 | 0.1 | 40[4] | 5 | 1.2 [4] | 12 | 60 | 95.62 | 86 |
| | AA | 10 | | | | | | | | |
| 256[5] | TDA | 90 | 0.1 | 0[2] | 10 | 0.61 [2] | 6 | 60 | 98.27 | 87.1 |
| | AA | 10 | | | | | | | | |
| 257[5] | TDA | 90 | 0.1 | 19[3] | 10 | 0.61 [2] | 6 | 60 | 98.15 | 87.0 |
| | AA | 10 | | | | | | | | |
| 258[5] | TDA | 90 | 0.1 | 40[4] | 10 | 0.61 [2] | 6 | 60 | 95.04 | 79.7 |
| | AA | 10 | | | | | | | | |
| 259[5] | TDA | 90 | 0.1 | 0[2] | 5 | 1.2 [4] | 12 | 60 | 97.65 | 77.1 |
| | AA | 10 | | | | | | | | |
| 260[5] | TDA | 90 | 0.1 | 19[3] | 5 | 1.2 [4] | 12 | 60 | 95.09 | 78.8 |
| | AA | 10 | | | | | | | | |
| 261[5] | TDA | 90 | 0.1 | 40[4] | 5 | 1.2 [4] | 12 | 60 | 95.41 | 76.9 |
| | AA | 10 | | | | | | | | |
| 262 | TDA | 90 | 0.1 | 0[2] | 5 | 1.2 [4] | 8 | 40 | 97.49 | 84.7 |
| | AA | 10 | | | | | | | | |
| 263 | TDA | 90 | — | 19[3] | 5 | 1.2 [4] | 8 | 40 | 97.11 | 82.2 |
| | AA | 10 | | | | | | | | |

[1]Cooled with dry ice.
[2]Cooled with ice.
[3]COMPARATIVE EXAMPLES: Irradiated under adiabatic conditions with an average starting temperature of about 19° C. or 23° C. as indicated.
[4]COMPARATIVE EXAMPLES: Sample placed upon an aluminum block preheated to about 40° C.
[5]Adhesive syrup covered with polymeric film.

Conclusions

IOA/IBnA (Nonpolar Comonomer)

Examples 207–212

Both conversion and gel content of an IOA/IBnA pressure-sensitive adhesive can be influenced by the temperature of the adhesive syrup during e-beam polymerization. At the residence times, dose rates and total doses tested, lower temperatures resulted in higher conversion and a higher percentage of gel.

Incorporation of a crosslinking agent to an IOA/IBn adhesive syrup resulted in a significant improvement in both conversion and gel content of the e-beam polymerized composition at constant residence time, dose rate and total dose.

IOA/NVP (Basic Comonomer)

Examples 213–218

Both the conversion and gel content of an IOA/NVP pressure-sensitive adhesive can be modestly influenced by the temperature of the adhesive syrup during e-beam polymerization. When the dose was insufficient to effect substantial conversion of monomer to polymer, the temperature of the adhesive syrup had limited effect upon the % conversion, and in many instances actually resulted in a decrease in conversion and decrease in gel content. However, at total doses sufficient to effect substantially complete conversion of monomer to polymer, the temperature effect became more pronounced, with the lower temperatures resulting in higher conversion and a higher percentage of gel.

IOA/OACM (Basic Comonomer)

Examples 219–225

Both the conversion and gel content of an IOA/OACM pressure-sensitive adhesive can be influenced by the temperature of the adhesive syrup during e-beam polymerization. When the residence time, dose rate and/or total dose were insufficient to effect substantial conversion of monomer to polymer, the temperature of the adhesive syrup had limited effect upon conversion and in many instances actually resulted in decreased conversion and decreased gel content. However, at residence times, dose rates and total doses sufficient to effect substantially complete conversion of monomer to polymer, the temperature effect became more pronounced, with the lower temperatures resulting in higher conversion and a higher percentage of gel.

IOA/AA (Acidic Comonomer)

Examples 226–236

Both the conversion and gel content of an IOA/AA pressure-sensitive adhesive can be influenced by the temperature of the adhesive syrup during e-beam polymerization. At the residence times, dose rates and total doses tested, lower temperatures resulted in higher conversion and a higher percentage of gel.

Incorporation of a crosslinking agent to an IOA/AA adhesive syrup resulted in a modest improvement in both conversion and gel content of the e-beam polymerized pressure-sensitive adhesive at the residence times, dose rates and total doses tested.

EHA/AA

Examples 237–247

Both the conversion and gel content of an EHA/AA pressure-sensitive adhesive can be influenced by the temperature of the adhesive syrup during e-beam polymerization. At the residence times, dose rates and total doses tested, samples polymerized at a temperature of 0° C. resulted in higher conversion and a higher percentage of gel relative to both samples polymerized at a temperature of –78° C. and samples polymerized at a temperature of 23° C.

LA/AA

Examples 248–255

Both conversion and gel content of a LA/AA pressure-sensitive adhesive can be influenced by the temperature of the adhesive syrup during e-beam polymerization. At the residence times, dose rates and total doses tested, lower temperatures resulted in higher conversion and a higher percentage of gel.

TDA/AA

Examples 256–263

Both conversion and gel content of a TDA/AA pressure-sensitive adhesive can be influenced by the temperature of the adhesive syrup during e-beam polymerization. At the residence times, dose rates and total doses tested, lower temperatures resulted in higher conversion and a higher percentage of gel.

Experiment IX

Examples 264–298
(Effect of Acrylic Acid Content Upon the Residual Content, Gel Content and Adhesive Properties of an E-Beam Polymerized IOA/AA Adhesive Syrup)
[Uncovered]

Procedure

A quantity of an adhesive syrup of isooctyl acrylate (IOA) and acrylic acid (AA), containing a wt % of AA as set forth in Table 9 and 0.04 pph IRGACURE 651 was partially photopolymerized in an inert nitrogen atmosphere using a 15-watt GE fluorescent black light to form a coatable adhesive syrup having a Brookfield viscosity of about 1500 cp. Into the prepolymerized syrup was added 0.3 pph of 1,6-Hexanedioldiacrylate (HDODA) unless otherwise noted in Table 9.

The HDODA-containing syrup was coated with a knife coater onto a 35 μm thick chemically treated polyester backing at a coating thickness of 50 μm. The coated polyester backing was cut into approximately 15 cm by 15 cm square samples and supported on a copper plate resting upon an ice-filled shuttle tray. The samples were maintained at temperatures of –78° C. (dry ice) or 0° C. (ice bath), as set forth in Table 9, throughout the irradiation process, with the trays generally repacked with ice for each sample. The coatings were polymerized "open-faced" (i.e., the coating was NOT covered with a protective film).

Each cooled sample was introduced through a system of interlocked doors into the shielded ante-chamber of a CB-175 ELECTROCURTAIN accelerated electron source manufactured by Energy Sciences, Inc. of Wilmington, Mass. An indicated accelerating potential of 175 kV was applied to the cathode. The speed of the tray through the irradiation window was set as specified in Table 9. The dose rate and total dose reported in Table 9 were obtained for the specified tray speed by adjusting the potentiometer that controlled the current level. The dose rate and total dose were calculated on the average dose over a distance of 10 cm of exposure.

A gaseous mixture of nitrogen and air was pumped into the irradiation chamber and the concentration of oxygen in the gaseous mixture continuously measured with a Delta F Oxygen Analyzer purchased from Delta F Corporation of Woburn, Mass. The concentration of oxygen in the gaseous mixture being pumped into the irradiation chamber for each sample was maintained between 50 and 60 ppm.

The % conversion, gel content, shear strength and peel adhesion of each irradiated sample was determined in accordance with the general procedures set forth above and recorded. The recorded values are reported in Table 9.

Reported Results

TABLE 9

| | | Adhesive Syrup | | Processing Parameters | | | | Properties of Polymerized Composition | | | |
|---|---|---|---|---|---|---|---|---|---|---|---|
| Example Number | Monomers | AA (wt %) | Temp. (° C.) | Resident Time (sec) | Speed (mpm) [ft/min] | Dose Rate (kGy/sec) | Dose (kGy) | Conversion (wt %) | Gel (wt %) | Peel Adhesion (N/dm) [oz/½in] | Shear 1st/2nd Samples (min) |
| 264 | IOA/AA | 0 | 0 | 10 | 0.61[2] | 7.0 | 70 | 94.26 | 51 | 52 [22.9] | 9 |
| 265 | IOA/AA | 0 | –78 | 10 | 0.61[2] | 4.47 | 44.7 | 97.93 | 45 | 37 [16.8] | 3 po |
| 266 | IOA/AA | 2 | 0 | 10 | 0.61[2] | 7 | 70 | 96.41 | 71 | 47 [21.5] | 39 po |
| 267 | IOA/AA | 2 | –78 | 10 | 0.61[2] | 4.47 | 44.7 | 98.54 | 69 | 44 [20.3] | 42 po |
| 268 | IOA/AA | 4 | 0 | 10 | 0.61[2] | 7 | 70 | 98.07 | 79 | 55 [25.1] | 174 po |
| 269 | IOA/AA | 4 | –78 | 10 | 0.61[2] | 4.47 | 44.7 | 98.34 | 73 | 54 [24.7] | 89 po |

TABLE 9-continued

| | Adhesive Syrup | | | Processing Parameters | | | | | Properties of Polymerized Composition | | |
|---|---|---|---|---|---|---|---|---|---|---|---|
| Example Number | Monomers | AA (wt %) | Temp. (° C.) | Resident Time (sec) | Speed (mpm) [ft/min] | Dose Rate (kGy/sec) | Dose (kGy) | Conversion (wt %) | Gel (wt %) | Peel Adhesion (N/dm) [oz/½in] | Shear 1st/2nd Samples (min) |
| 270 | IOA/AA | 6 | 0 | 10 | 0.61[2] | 7 | 70 | 98.54 | 82 | 62 [28.1] | 478 po |
| 271 | IOA/AA | 6 | −78 | 10 | 0.61[2] | 4.47 | 44.7 | 98.67 | 77 | 56 [25.7] | 216 |
| 272 | IOA/AA | 8 | 0 | 10 | 0.61[2] | 7 | 70 | 98.81 | 87 | 61 [28] | 10,000+ |
| 273 | IOA/AA | 8 | −78 | 10 | 0.61[2] | 4.47 | 44.7 | 98.84 | 82 | 62 28.3 | 5904 po |
| 274 | IOA/AA | 10 | 0 | 10 | 0.61[2] | 7 | 70 | 98.56 | 86 | 68 [31.1] | 10,000+ |
| 275 | IOA/AA | 10 | −78 | 10 | 0.61[2] | 4.47 | 44.7 | 98.90 | 80 | 64 [29] | 708 po |
| 276 | IOA/AA | 13 | 0 | 10 | 0.61[2] | 7 | 70 | 98.32 | 88 | 83 [37.7] | 10,000+ |
| 277 | IOA/AA | 13 | −78 | 10 | 0.61[2] | 4.47 | 44.7 | 98.54 | 84 | 74 [34] | 2554 po |
| 278 | IOA/AA | 15 | 0 | 10 | 0.61[2] | 7 | 70 | 98.18 | 89 | 83 [38.1] | 10,000+ |
| 279 | IOA/AA | 15 | −78 | 10 | 0.61[2] | 4.47 | 44.7 | 98.63 | 85 | 76 [34.6] | 2948 po |
| 280 | IOA/AA | 17 | 0 | 10 | 0.61[2] | 7 | 70 | 99.08 | 91 | 20 [9] | 10,000+ |
| 281 | IOA/AA | 17 | −78 | 10 | 0.61[2] | 4.47 | 44.7 | 99.33 | 88 | 30 [13.7] | 1542 po |
| 282 | IOA/AA | 20 | 0 | 10 | 0.61[2] | 7 | 70 | 98.54 | 90 | 6 [2.8] | 10,000+ |
| 283 | IOA/AA | 20 | −78 | 10 | 0.61[2] | 4.47 | 44.7 | 95.02 | 82 | 11 [5.1] | 10,000+ |
| 284 | IOA/AA | 0 | 0 | 5 | 1.2 [4] | 12 | 60 | 66 | 25 | 49 [22.5] | 2 residue |
| 285 | IOA/AA | 2 | 0 | 5 | 1.2 [4] | 12 | 60 | 65 | 29 | 65 [29.9] | 26 po |
| 286 | IOA/AA | 4 | 0 | 5 | 1.2 [4] | 12 | 60 | 70 | 40 | 67 [30.6] | 172/ 309 po |
| 287 | IOA/AA | 6 | 0 | 5 | 1.2 [4] | 12 | 60 | 78 | 55 | 60 [27.2] | 8779/ 9526 po |
| 288 | IOA/AA | 8 | 0 | 5 | 1.2 [4] | 12 | 60 | 86 | 70 | 67 [30.6] | 10,000+ |
| 289 | IOA/AA | 10 | 0 | 5 | 1.2 [4] | 12 | 60 | 94 | 72 | 69 [31.4] | 2545 po; 10,000+ |
| 290 | IOA/AA | 15 | 0 | 5 | 1.2 [4] | 12 | 60 | 97 | 81 | 81 [37.1] | 7928 po/ 10,000+ |
| 291 | IOA/AA | 20 | 0 | 5 | 1.2 [4] | 12 | 60 | 97 | 83 | 11 [4.9] | 10,000+ |
| 292 | IOA/AA[1] | 10 | 0 | 5 | 1.2 [4] | 12 | 60 | 94 | 94 | 60 [30] | 10,000+ |
| 293 | IOA/AA[1] | 10 | 0 | 10 | 0.61[2] | 7 | 70 | 99.88 | 84 | 58 [26.6] | 10,000+ |
| 294 | IOA/AA[1] | 10 | −78 | 10 | 0.61[2] | 4.47 | 44.7 | 99.06 | 72 | 64 [29.1] | 3018 |
| 295 | IOA/AA | 10 | 0 | 10 | 0.61[2] | 5.25 | 52.5 | 99.27 | — | 75 [34.1] | 10,000+ |
| 296 | IOA/AA | 10 | 0 | 5 | 1.2 [4] | 7.96 | 39.8 | 98.63 | — | 73 [33.4] | 10,000+ |
| 297 | IOA/AA | 10 | 0 | 3.33 | 1.8 [0] | 17.46 | 58.2 | 98.96 | — | 67 [30.5] | 10,000+ |
| 298 | IOA/AA | 10 | 0 | 2.5 | 2.4 [8] | 23.08 | 57.7 | 97.18 | — | 43 [19.6] | 10,000+ |

[1]Contains No HDODA crosslinking agent.

Conclusions

The concentration of acrylic acid in an adhesive syrup of isooctyl acrylate and acrylic acid (IOA/AA) can significantly impact the adhesive properties and characteristics of the resultant e-beam polymerized pressure-sensitive adhesive. For the residence times, dose rates and total doses tested, an excellent balance in % conversion, gel content, peel adhesion and shear strength is observed for AA concentrations of greater than about 4 wt % and less than about 20 wt %, more specifically between about 8 wt % and 15 wt %.

We claim:

1. A method for forming a pressure-sensitive adhesive article comprising coating an adhesive syrup containing a $C_{8-13}$ alkyl acrylate monomer and a comonomer on a substrate, irradiating the syrup with accelerated electrons at a temperature below 20° C. to polymerize the syrup, wherein the comonomer is selected so as to form a pressure-sensitive adhesive when polymerized with the $C_{8-13}$ alkyl acrylate monomer.

2. The method of claim 1 wherein the adhesive syrup includes at least one comonomer, wherein the comonomer is selected from the group consisting of acrylic acid, isobornyl acrylate, octylacrylamide and n-vinyl pyrrolidone.

3. The method of claim 1 wherein the adhesive syrup further includes up to about 0.5 parts per hundred crosslinking agent.

4. The method of claim 1 wherein the $C_{8-13}$ alkyl acrylate monomer is selected from the group consisting of isooctyl acrylate, 2-ethylhexyl acrylate lauryl acrylate and tridecyl acrylate.

5. The method of claim 1 further comprising coating the adhesive syrup onto a substrate before irradiating the syrup.

6. The method of claim 5 wherein the adhesive syrup is coated onto a substrate at a thickness of between about 10 to 500 microns.

7. The method of claim 1 wherein the adhesive syrup is irradiated with a dose of 20 to 100 kGy of accelerated electrons.

8. The method of claim 1 wherein the adhesive syrup is irradiated with accelerated electrons over a residence time of greater than 1 second.

9. The method of claim 1 wherein the adhesive syrup is irradiated with accelerated electrons over a residence time of greater than 5 second.

10. The method of claim 1 wherein irradiating the adhesive syrup with accelerated electrons at a temperature below 20° C. comprises irradiating the adhesive syrup with accelerated electrons at a temperature below 5° C.

11. The method of claim 1 wherein the adhesive syrup is irradiated in a chamber atmosphere comprising up to 3000 ppm oxygen.

12. The method of claim 1 wherein the adhesive syrup is irradiated in a chamber atmosphere comprising up to 1000 ppm oxygen.

13. The method of claim 1 wherein the polymerized acrylate pressure-sensitive adhesive has a conversion of greater than 90 wt %.

14. The method of claim 2 wherein the polymerized acrylate pressure-sensitive adhesive has a conversion of greater than 97 wt %.

15. The method of claim 1 wherein the polymerized acrylate pressure-sensitive adhesive has a shear adhesion time of greater than 10,000 minutes.

16. The method of claim 1 wherein the polymerized acrylate pressure-sensitive adhesive has a peel adhesion to glass of greater than 55 N/dm.

17. The method of claim 1 wherein the polymerized acrylate pressure-sensitive adhesive has a shear adhesion time of greater than 10,000 minutes and a peel adhesion to glass of greater than 55 N/dm.

18. The method of claim 1 wherein the polymerized acrylate pressure-sensitive adhesive has a conversion of greater than 90 wt %, a shear adhesion time of greater than 10,000 minutes and a peel adhesion to glass of greater than 55 N/dm.

19. A process for the production of a pressure-sensitive adhesive, comprising:

irradiating an adhesive syrup of a $C_{8-13}$ alkyl acrylate monomer and at least one comonomer, with between about 20 to 100 kGy of accelerated electrons at a residence time of greater than 1 second, and at a temperature of between about −78° C. to 20° C., wherein the resultant pressure-sensitive adhesive has a peel adhesion of at least 25 N/dm, a shear strength of at least 300 minutes and a conversion of greater than 90 wt %.

20. A process for the production of a pressure-sensitive adhesive, comprising:

irradiating an adhesive syrup of an $C_{8-13}$ alkyl acrylate monomer selected from the group consisting of isooctyl acrylate and 2-ethylhexyl acrylate, and at least one comonomer, with between about 20 to 100 kGy of accelerated electrons at a residence time of greater than about 5 seconds, and at a temperature of between about 0° C. and 20° C., wherein the resultant pressure-sensitive adhesive has a peel adhesion of at least 55 N/dm, a shear strength of at least 10,000 minutes and a conversion of greater than 97 wt %.

21. The pressure-sensitive adhesive produced in accordance with the method of claim 1.

22. The pressure-sensitive adhesive produced in accordance with the method of claim 19.

23. The pressure-sensitive adhesive produced in accordance with the method of claim 20.

* * * * *

UNITED STATES PATENT AND TRADEMARK OFFICE
CERTIFICATE OF CORRECTION

PATENT NO. : 6,232,365 B1
DATED : May 15, 2001
INVENTOR(S) : Douglas E. Weiss and Bruce A. Sventek It is certified that error appears in the above-identified patent and that said Letters Patent is hereby corrected as shown below:

Column 2,
Line 56, "kilogray" should read -- kiloGray --

Column 4,
Line 38, "OC" should read -- 0° C --

Column 6,
Line 38, "10C" should read -- 10° --

Column 8,
Line 2, "filly" should read -- fully --

Column 12,
Line 17, "1000C" should read -- 100° C --

Column 30,
Line 8, "400C" should read -- 40° --

Column 36,
Line 10, "0.61 2]" should read -- 0.61 [2] --

Column 41,
Line 14, "Claim #4" after "acrylate" add -- , --

Signed and Sealed this

Twenty-sixth Day of February, 2002

Attest:

JAMES E. ROGAN
Attesting Officer
Director of the United States Patent and Trademark Office